US012726823B2

(12) United States Patent
Elshafie et al.

(10) Patent No.: US 12,726,823 B2
(45) Date of Patent: Sep. 1, 2026

(54) METHODS AND APPARATUS FOR BANNING DEVICES PERFORMING ACTIVE SECURITY ATTACKS

(71) Applicant: QUALCOMM Incorporated, San Diego, CA (US)

(72) Inventors: Ahmed Elshafie, San Diego, CA (US); Alexandros Manolakos, Escondido, CA (US); Guttorm Ringstad Opshaug, Redwood City, CA (US)

(73) Assignee: QUALCOMM Incorporated, San Diego, CA (US)

(*) Notice: Subject to any disclaimer, the term of this patent is extended or adjusted under 35 U.S.C. 154(b) by 324 days.

(21) Appl. No.: 18/288,986

(22) PCT Filed: Mar. 30, 2022

(86) PCT No.: PCT/US2022/022531
§ 371 (c)(1),
(2) Date: Oct. 30, 2023

(87) PCT Pub. No.: WO2022/260743
PCT Pub. Date: Dec. 15, 2022

(65) Prior Publication Data

US 2024/0224042 A1 Jul. 4, 2024

(30) Foreign Application Priority Data

Jun. 11, 2021 (GR) .............................. 20210100382

(51) Int. Cl.
*H04W 12/122* (2021.01)
*H04B 17/336* (2015.01)
(Continued)

(52) U.S. Cl.
CPC ........ *H04W 12/122* (2021.01); *H04B 17/336* (2015.01); *H04W 48/02* (2013.01); *H04W 72/232* (2023.01)

(58) Field of Classification Search
CPC ... H04W 12/22; H04W 72/232; H04W 48/02; H04B 17/336
See application file for complete search history.

(56) References Cited

U.S. PATENT DOCUMENTS 10,091,697 B1 10/2018 Uplenchwar et al.
2019/0090258 A1* 3/2019 Ryu ...................... H04L 1/1861
(Continued)

FOREIGN PATENT DOCUMENTS

| | | | |
|---|---|---|---|
| EP | 3691327 | A1 | 8/2020 |
| WO | 2020145562 | A1 | 7/2020 |
| WO | 2021097253 | A1 | 5/2021 |

OTHER PUBLICATIONS

Agarwal M., et al., "Machine Learning Approach for Detection of Flooding DoS Attacks in 802.11 Networks and Attacker Localization", International Journal of Machine Learning and Cybernetics, Springer Berlin Heidelberg, Berlin/Heidelberg, vol. 7, No. 6, Nov. 2, 2014, XP036096204, pp. 1035-1051.
(Continued)

*Primary Examiner* — Curtis B Odom
(74) *Attorney, Agent, or Firm* — Thien T. Nguyen

(57) ABSTRACT

A user equipment (UE) detects signals transmitted by one or more attacking devices that interfere with downlink signals from base stations. The UE measures the angle of arrival (AoA) and power information of the interfering signals and sends an interference report to a serving base station. The base station may receive interference reports for the interfering signals from multiple UEs. One or more base stations may determine the identity of the attacking device based on the position of the attacking device determined using the
(Continued)

information from the interference report and known positions of devices connected to the network. The one or more base stations may bar access to the network by the attacking device once the attacking device is identified and/or may report the attacking device.

42 Claims, 11 Drawing Sheets

(51) Int. Cl.
*H04W 48/02* (2009.01)
*H04W 72/232* (2023.01)

(56) References Cited

U.S. PATENT DOCUMENTS

2019/0356685 A1 11/2019 Naserian et al.
2023/0007483 A1 * 1/2023 Mueck ................. G06Q 50/265

OTHER PUBLICATIONS

International Search Report and Written Opinion—PCT/US2022/022531—ISA/EPO—Jul. 20, 2022.

* cited by examiner

METHODS AND APPARATUS FOR BANNING DEVICES PERFORMING ACTIVE SECURITY ATTACKS

CROSS REFERENCE TO RELATED APPLICATIONS

This application is a National Stage Application filed under 35 U.S.C. § 371 of PCT International Application Serial No. PCT/US2022/022531 entitled "METHOD AND APPARATUS FOR BANNING DEVICES PERFORMING ACTIVE SECURITY ATTACKS" and filed on Mar. 30, 2022, which claims the benefit of Greek patent application No. 20210100382, entitled "METHODS AND APPARATUS FOR BANNING DEVICES PERFORMING ACTIVE SECURITY ATTACKS" filed Jun. 11, 2021, which are assigned to the assignee hereof and are expressly incorporated herein by reference in their entirety.

BACKGROUND

Field

The present disclosure relates generally to the field of wireless communications, and more specifically to detecting attacking identifying and barring interfering devices from a wireless network.

Information:

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as user equipments (UEs).

At times, a wireless communications system may be vulnerable to a variety of insecurities. Many association, authentication, and verification processes may exist that are designed to help mitigate or prevent such insecurities. However, in some cases, a wireless communications system may be vulnerable to attacks from a jamming device. The jamming device may overload, or otherwise interfere with, resources (e.g., time, frequency, etc.) of the wireless communications system for the purpose of disrupting communication between base stations and UEs. For example, a jamming device may determine identifiers associated with a UE and may then transmit signals that jam uplink and/or downlink radio resources used by a UE for communication with a base station.

The jamming device may have limited power and signal strength, and often cannot identify the precise location of all the UEs in a wireless communications system. Such a jamming device may not be capable of disrupting the entire radio spectrum or the entire coverage area of a wireless communications system, but may instead launch a targeted jamming attack directed toward specific devices. As uplink information for multiple UEs may be allocated to the same resources, the jamming device may target these resources to disrupt communication for multiple, or sometimes all, UEs connected to a base station. Identification of such attacking devices and appropriate remedial action is desirable.

SUMMARY

A user equipment (UE) detects signals transmitted by one or more attacking devices that interfere with downlink signals from base stations. The UE measures the angle of arrival (AoA) and power information of the interfering signals and sends an interference report to a serving base station. The base station may receive interference reports for the interfering signals from multiple UEs. One or more base stations may determine the identity of the attacking device based on the position of the attacking device determined using the information from the interference report and known positions of devices connected to the network. The one or more base stations may bar access to the network by the attacking device once the attacking device is identified and/or may report the attacking device.

In one implementation, method performed by base station in a wireless network for preventing active security attacks in the wireless network, the method comprising: receiving an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determining whether the device is engaged in an active security attack in the wireless network based at least in part on the AoA and power information received in the interference report from the UE, and in response to a determination that the device is engaged in the active security attack, performing at least one of barring the device from accessing the wireless network, sending a report indicating that the device is engaged in the active security attack, or both.

In one implementation, base station in a wireless network configured for preventing active security attacks in the wireless network, comprising: a wireless transmitter configured to communicate with entities in a wireless network; at least one memory; and at least one processor coupled to the wireless interface and the at least one memory, the at least one processor configured to: receive, via the wireless transceiver, an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determine whether the device is engaged in an active security attack in the wireless network based at least in part on the AoA and power information received in the interference report from the UE, and in response to a determination that the device is engaged in the active security attack, the at least one processor is configured to perform at least one of barring the device from accessing the wireless network, sending a report indicating that the device is engaged in the active security attack, or both.

In one implementation, base station in a wireless network configured for preventing active security attacks in the wireless network, comprising: means for receiving an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; means for determining whether the device is engaged in an active security attack in the wireless network based at least in part on the AoA and power information received in the interference report from the UE, and in response to a determination that the device is engaged in the active security attack, the base station comprises a means for barring that bars the device from accessing the wireless network, a means for reporting that sends a report indicating that the device is engaged in the active security attack, or both.

In one implementation, non-transitory computer storage medium including program code stored thereon, the program code is operable to configure at least one processor in a base station in a wireless network for preventing active security attacks in the wireless network, the program code comprising instructions to: receive an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determine whether the device is engaged in an active security attack in the wireless network based at least in part on the AoA and power information received in the interference report from the UE, and in response to a determination that the device is engaged in the active security attack, the program code comprises instructions for at least one of barring the device from accessing the wireless network, sending a report indicating that the device is engaged in the active security attack, or both.

In one implementation, method performed by a user equipment (UE) for preventing active security attacks in a wireless network, the method comprising: detecting interfering signals transmitted by a device, wherein the interfering signals interfere with downlink transmissions from a base station; measuring an angle of arrival (AoA) and power information of one or more interfering signals from the device; and sending an interference report to the base station, the interference report comprising the AoA and power information for the one or more interfering signals.

In one implementation, user equipment (UE) configured for preventing active security attacks in a wireless network, the method comprising: a wireless transceiver configured to communicate with base stations in a wireless network; at least one memory; and at least one processor coupled to the wireless transceiver and the at least one memory, the at least one processor configured to: detect interfering signals transmitted by a device, wherein the interfering signals interfere with downlink transmissions from a base station; measure an angle of arrival (AoA) and power information of one or more interfering signals from the device; and send, via the wireless transceiver, an interference report to the base station, the interference report comprising the AoA and power information for the one or more interfering signals.

In one implementation, user equipment (UE) configured for preventing active security attacks in a wireless network, the method comprising: means for detecting interfering signals transmitted by a device, wherein the interfering signals interfere with downlink transmissions from a base station; means for measuring an angle of arrival (AoA) and power information of one or more interfering signals from the device; and means for sending an interference report to the base station, the interference report comprising the AoA and power information for the one or more interfering signals.

In one implementation, non-transitory computer storage medium including program code stored thereon, the program code is operable to configure at least one processor in a user equipment (UE) for preventing active security attacks in a wireless network, the program code comprising instructions to: detect interfering signals transmitted by a device, wherein the interfering signals interfere with downlink transmissions from a base station; measure an angle of arrival (AoA) and power information of one or more interfering signals from the device; and send an interference report to the base station, the interference report comprising the AoA and power information for the one or more interfering signals.

BRIEF DESCRIPTION OF THE FIGURES

Claimed subject matter is particularly pointed out and distinctly claimed in the concluding portion of the specification. However, both as to organization and/or method of operation, together with features and/or advantages thereof, it may best be understood by reference to the following detailed description if read with the accompanying drawings in which:

Figure 1:
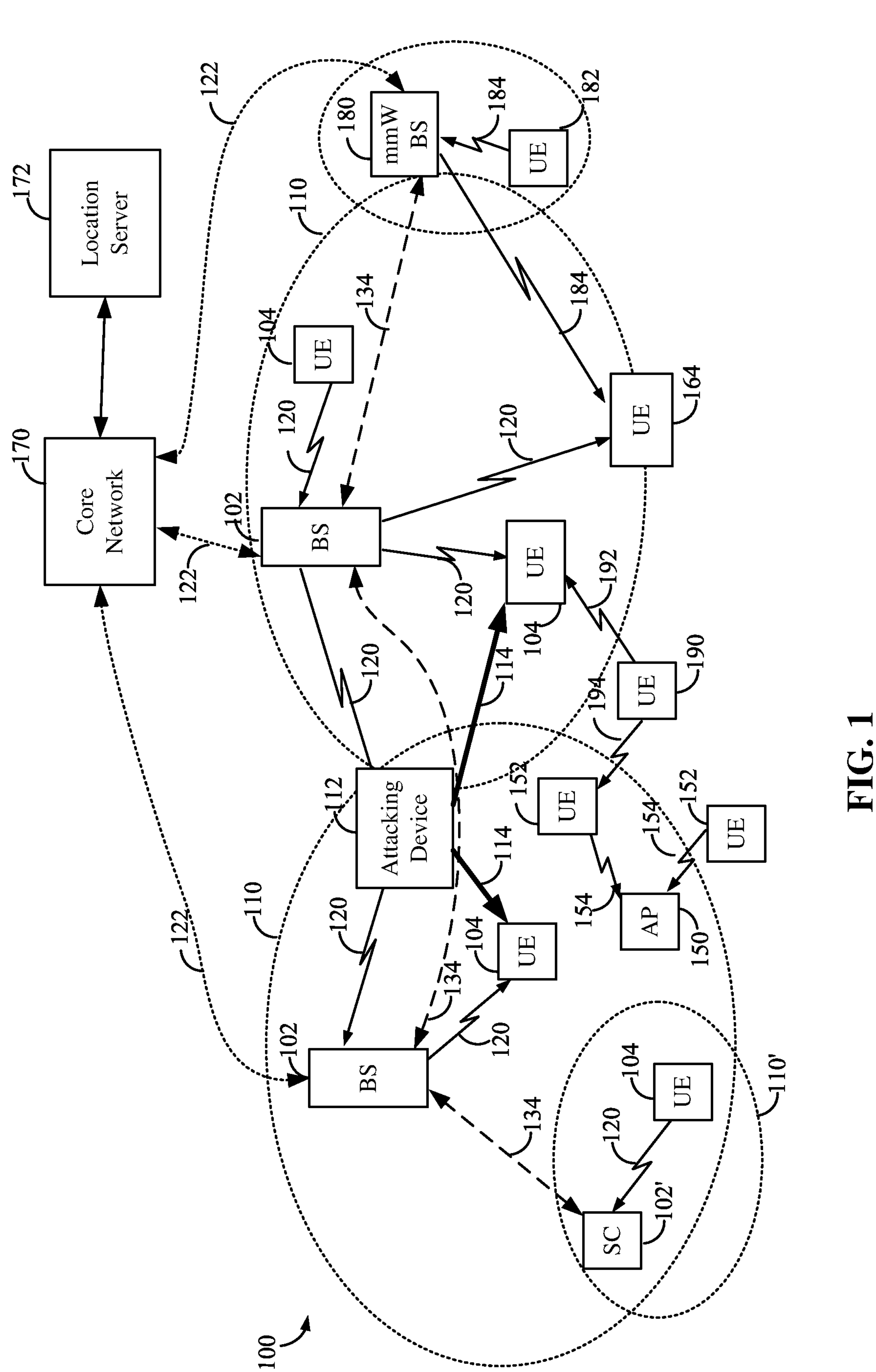
FIG. 1 is a diagram of a wireless communication system.

Like reference symbols in the various drawings indicate like elements, in accordance with certain example implementations. In addition, multiple instances of an element may be indicated by following a first number for the element with a letter or a hyphen and a second number. For example, multiple instances of an element 210 may be indicated as 210-1, 210-2, 210-3 etc. or as 210*a*, 210*b*, 210*c*, etc. When referring to such an element using only the first number, any instance of the element is to be understood (e.g., element 210 in the previous example would refer to elements 110-1, 210-2, and 210-3 or to elements 210*a*, 210*b*, and 210*c*).

DETAILED DESCRIPTION

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "one or more processors configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof.

Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which UEs can send signals to other UEs is called a sidelink (SL) channel. As used herein the term traffic channel (TCH) can refer to either an UL/reverse or DL/forward traffic channel.

The term "base station" may refer to a single physical transmission reception point (TRP) or to multiple TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for the Global Navigation Satellite System (GNSS), Time Difference Of Arrival (TDOA), Angle of Departure (AoD), Angle of Arrival (AoA), Round-Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

A radio access network may employ reconfigurable intelligent surfaces (which may also be referred to as reconfigurable intelligent surfaces (RISs)) to increase a communications range of devices with minimal increase to an amount of power consumed by the radio access network. A reconfigurable surface may include an array of reflective elements that can be semi statically configured to change an angle of reflection of the reconfigurable surface—e.g., by adjusting reflection coefficients for the reflective elements.

A wireless communications system may be vulnerable to a variety of insecurities. While many association, authentication, and verification processes may be used to mitigate or prevent some insecurities, in some cases, a wireless communications system may be vulnerable to active security attacks, such as jamming. For example, an attacking device may overload, or otherwise interfere with, resources (e.g., time, frequency, etc.) of the wireless communications system for the purpose of disrupting communication between base stations and UEs. In some examples, a jamming device may determine identifiers associated with a UE and may transmit signals that jam uplink and/or downlink radio resources used by that UE for communication with a base station. An attacking device, for example, may be another UE, a wearable device, a RIS, or other types of devices.

Due to limitations of power and signal strength, a jamming device may not be capable of disrupting the entire radio spectrum or the entire coverage area of a wireless communication system, but may instead launch a targeted jamming attack directed toward specific devices or towards devices within a specific area. As communication channel information for multiple UEs may be allocated to the same resources, the jamming device may target these resources to disrupt communication for multiple, or sometimes all, UEs connected to a base station. For example, attacking devices may know the structure of communications with a base station, such as the Time Division Duplex (TDD) pattern, Frequency Division Duplex (FDD) pattern, Bandwidth Parts (BWPs), etc., and may target attacks to overwhelm communications by disrupting communications using the communication structures. Identification of attacking devices and appropriate remedial action is necessary to provide a secure communications system.

In an implementation, one or more UEs that detect one or more interfering signals from attacking devices may measure an angle of arrival (AoA) and power information (e.g., RSRP) of the interfering signals. The AoA may be correspond to azimuth of arrival or zenith of arrival, or a combination thereof. The UE(s) may prepare and send interference report to a base station that includes the measured AoA and RSRP for the interfering signals. Upon receipt of the interference report, the base station may determine the whether the interference signal is an active security attack in the wireless network based at least in part on the AoA and RSRP information. For example, the base station may be a control unit or may forward the information to a control unit, which may collect additional interference reports and determine based on a number of interference reports whether a particular device is engaged in an active attack on the wireless network and the position attacking of the device. The attacking device may be barred from the wireless network to prevent further attacks.

FIG. 1 illustrates an exemplary wireless communications system 100 in which an attacking device 112 may be detected and barred from the wireless network, as discussed herein. The wireless communications system 100 (which may also be referred to as a wireless wide area network (WWAN)) may include various base stations 102, sometimes referred to herein as TRPs 102, and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the “primary carrier” or “anchor carrier” or “primary serving cell” or “PCell,” and the remaining carrier frequencies are referred to as “secondary carriers” or “secondary serving cells” or “SCells.” In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a “serving cell” (whether a PCell or an SCell) corresponds to a carrier frequency/component carrier over which some base station is communicating, the term “cell,” “serving cell,” “component carrier,” “carrier frequency,” and the like can be used interchangeably.

For example, still referring to FIG. 1, one of the frequencies utilized by the macro cell base stations 102 may be an anchor carrier (or “PCell”) and other frequencies utilized by the macro cell base stations 102 and/or the mmW base station 180 may be secondary carriers (“SCells”). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Attacking device 112 may be connected to one or more base stations 102 and may, accordingly, know the structure of communications with the base stations, such as the TDD or FDD patterns, BWPs, etc. The attacking device 112 may transmit interfering signals 114 based on the structure of communications, where the interfering signals 114 interfere with the reception of DL signals by one or more UEs 104.

Figure 2:
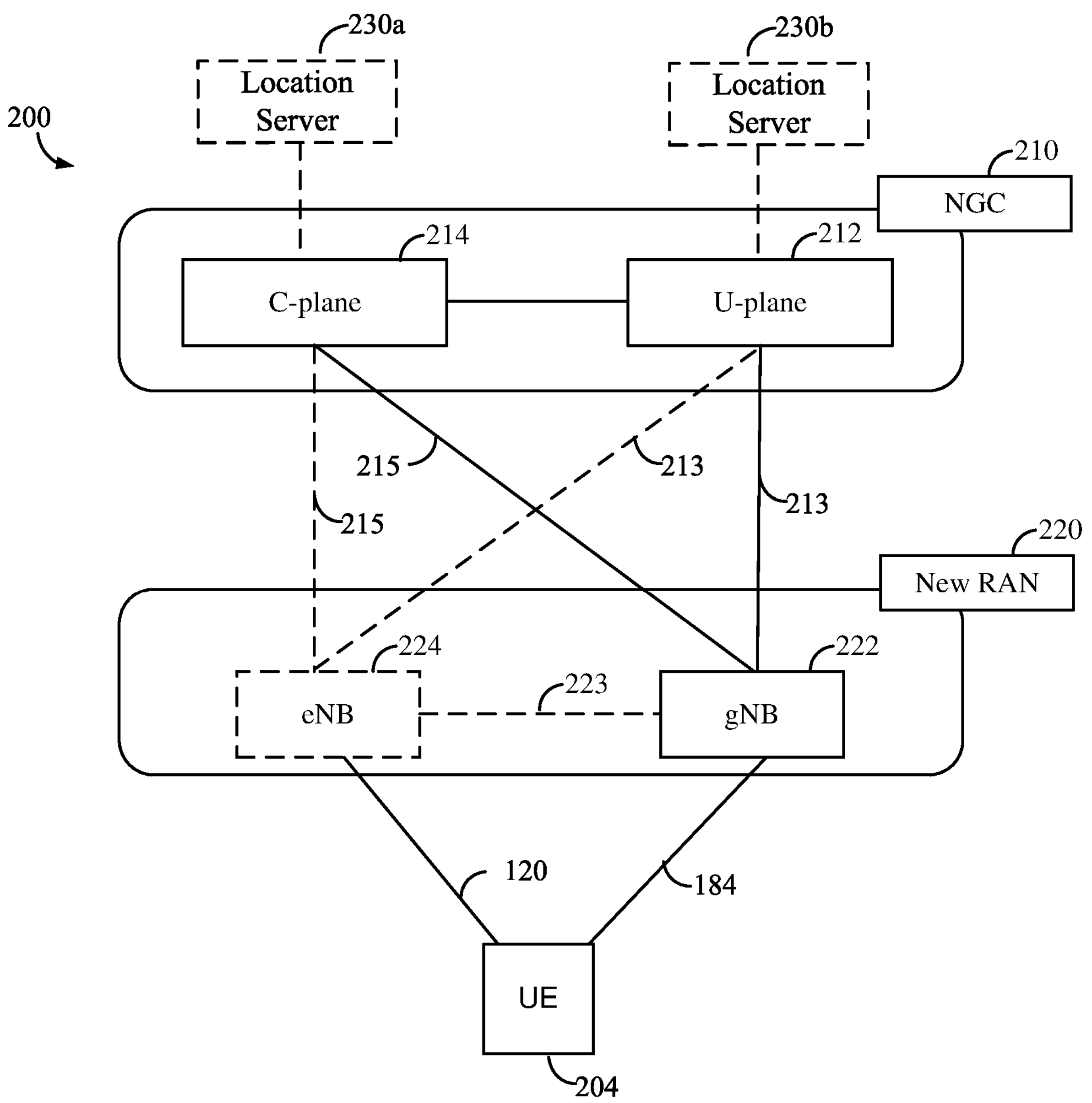
FIGS. 2 and 3 illustrate examples of a wireless network structure.

FIG. 2 illustrates an example wireless network structure 200. For example, an NGC 210 (also referred to as a “5GC”) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230*a*, 230*b* (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 3:
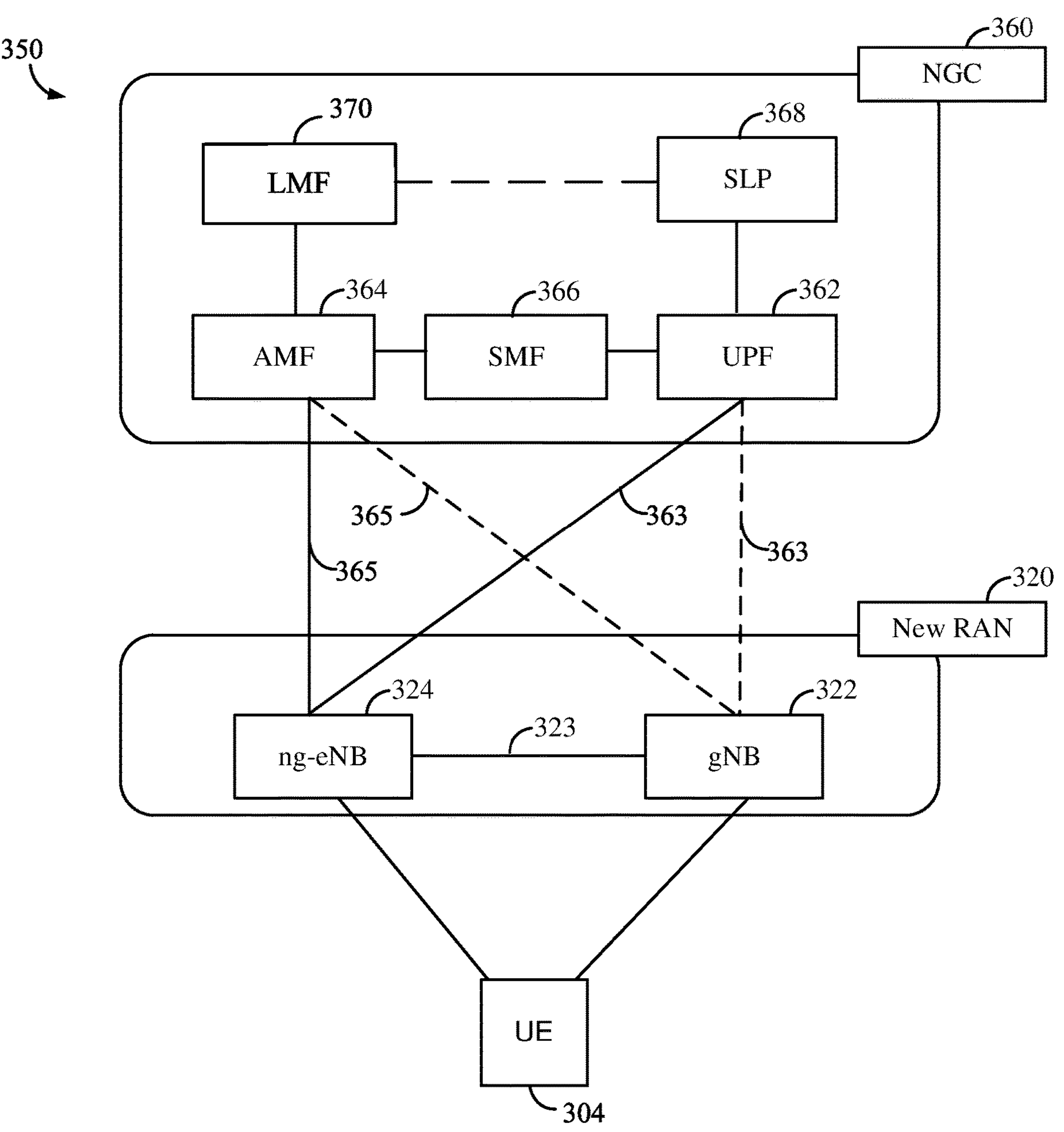

FIG. 3 illustrates another example wireless network structure 350. For example, an NGC 360 (also referred to as a “5GC”) can be viewed functionally as control plane functions, provided by an access and mobility management function (AMF) 364, user plane function (UPF) 362, a session management function (SMF) 366, SLP 368, and an LMF 370, which operate cooperatively to form the core network (i.e., NGC 360). User plane interface 363 and control plane interface 365 connect the ng-eNB 324 to the NGC 360 and specifically to UPF 362 and AMF 364, respectively. In an additional configuration, a gNB 322 may also be connected to the NGC 360 via control plane interface 365 to AMF 364 and user plane interface 363 to UPF 362. Further, eNB 324 may directly communicate with gNB 322 via the backhaul connection 323, with or without gNB direct connectivity to the NGC 360. In some configurations, the New RAN 320 may only have one or more gNBs 322, while other configurations include one or more of both ng-eNBs 324 and gNBs 322. Either gNB 322 or eNB 324 may communicate with UEs 304 (e.g., any of the UEs depicted in FIG. 1). The base stations of the New RAN 320 communicate with the AMF 364 over the N2 interface and the UPF 362 over the N3 interface.

The functions of the AMF include registration management, connection management, reachability management, mobility management, lawful interception, transport for session management (SM) messages between the UE 304 and the SMF 366, transparent proxy services for routing SM messages, access authentication and access authorization, transport for short message service (SMS) messages between the UE 304 and the short message service function (SMSF) (not shown), and security anchor functionality (SEAF). The AMF also interacts with the authentication server function (AUSF) (not shown) and the UE 304, and receives the intermediate key that was established as a result of the UE 304 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 304 and the location management function (LMF) 370 (which may correspond to location server 172), as well as between the New RAN 220 and the LMF 370, evolved packet system (EPS) bearer identifier allocation for interworking with the EPS, and UE 304 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 366 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 366 communicates with the AMF 364 is referred to as the N11 interface.

Another optional aspect may include an LMF 370, which may be in communication with the NGC 360 to provide location assistance for UEs 304. The LMF 370 can be implemented as a plurality of separate servers (e.g., physically separate servers, different software modules on a single server, different software modules spread across multiple physical servers, etc.), or alternately may each correspond to a single server. The LMF 370 can be configured to support one or more location services for UEs 304 that can connect to the LMF 370 via the core network, NGC 360, and/or via the Internet (not illustrated).

Figure 4:
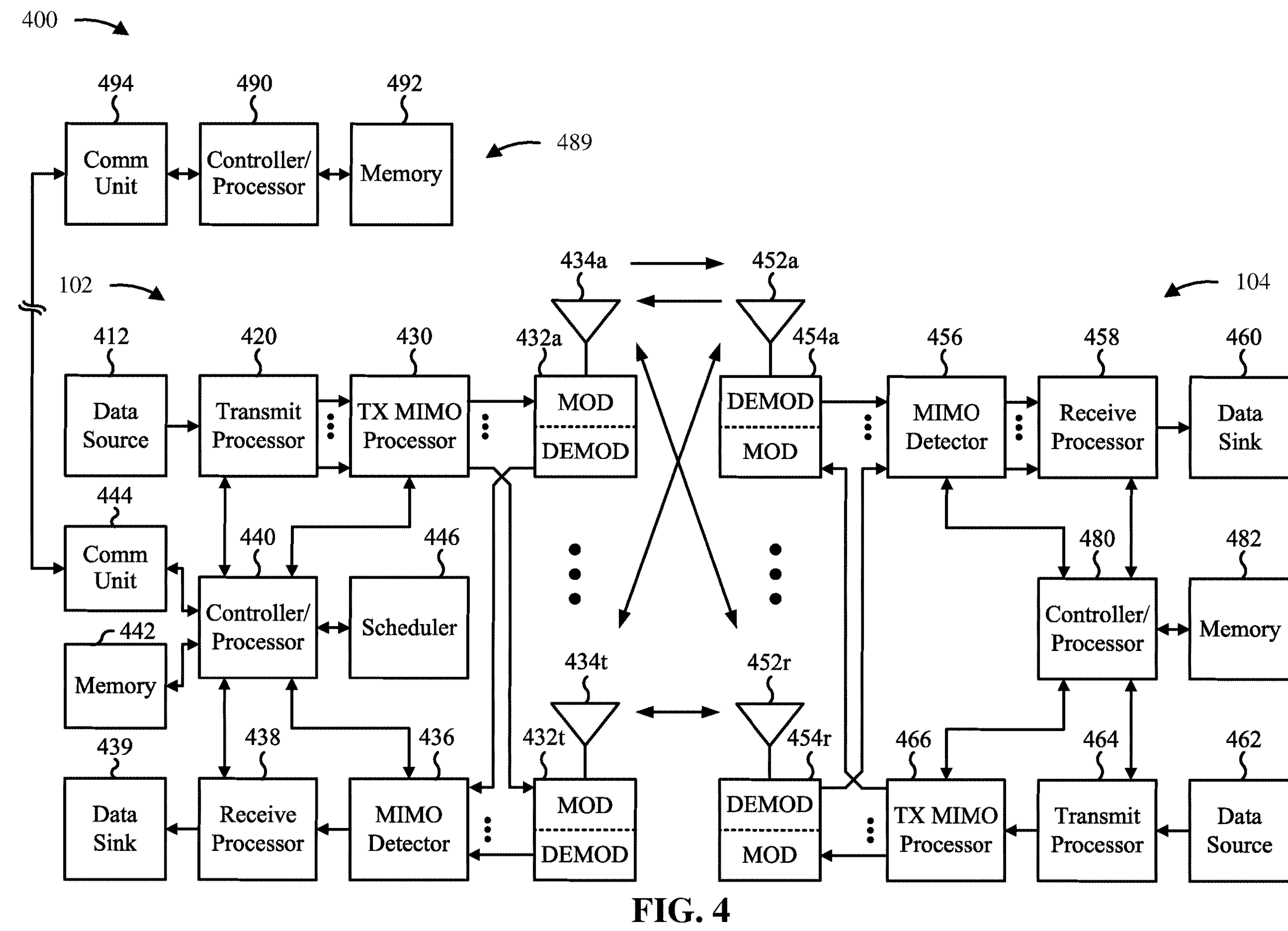
FIG. 4 shows a block diagram of a design of a base station and UE.

FIG. 4 shows a block diagram of a design 400 of base station 102 and UE 104, which may be one of the base stations and one of the UEs in FIG. 1. Base station 102 may be equipped with T antennas 434*a* through 434*t*, and UE 104 may be equipped with R antennas 452*a* through 452*r*, where in general T≥1 and R≥1.

At base station 102, a transmit processor 420 may receive data from a data source 412 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 420 may also process system information (e.g., for semi-static resource partitioning information (SRPI) and/or the like) and control information (e.g., CQI requests, grants, upper layer signaling, and/or the like) and provide overhead symbols and control symbols. Transmit processor 420 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 430 may perform spatial processing (e.g., precoding) on the data symbols, the control symbols, the overhead symbols, and/or the reference symbols, if applicable, and may provide T output symbol streams to T modulators (MODs) 432*a* through 432*t*. Each modulator 432 may process a respective output symbol stream (e.g., for OFDM and/or the like) to obtain an output sample stream. Each modulator 432 may further process (e.g., convert to analog, amplify, filter, and upconvert) the output sample stream to obtain a downlink signal. T downlink signals from modulators 432*a* through 432*t* may be transmitted via T antennas 434*a* through 434*t*, respectively. According to various aspects described in more detail below, the synchronization signals can be generated with location encoding to convey additional information.

At UE 104, antennas 452*a* through 452*r* may receive the downlink signals from base station 102 and/or other base stations and may provide received signals to demodulators (DEMODs) 454*a* through 454*r*, respectively. Each demodulator 454 may condition (e.g., filter, amplify, down convert, and digitize) a received signal to obtain input samples. Each demodulator 454 may further process the input samples (e.g., for OFDM and/or the like) to obtain received symbols. A MIMO detector 456 may obtain received symbols from all R demodulators 454*a* through 454*r*, perform MIMO detection on the received symbols if applicable, and provide detected symbols. A receive processor 458 may process (e.g., demodulate and decode) the detected symbols, provide decoded data for UE 104 to a data sink 460, and provide decoded control information and system information to a controller/processor 480. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 464 may receive and process data from a data source 462 and control information (e.g., for reports comprising RSRP, RSSI, RSRQ, CQI, and/or the like) from controller/processor 480. Transmit processor 464 may also generate reference symbols for one or more reference signals. The symbols from transmit processor 464 may be precoded by a TX MIMO processor 466 if applicable, further processed by modulators 454*a* through 454*r* (e.g., for DFT-s-OFDM, CP-OFDM, and/or the like), and transmitted to base station 102. At base station 102, the uplink signals from UE 104 and other UEs may be received by antennas 434, processed by demodulators 432, detected by a MIMO detector 436 if applicable, and further processed by a receive processor 438 to obtain decoded data and control information sent by UE 104. Receive processor 438 may provide the decoded data to a data sink 439 and the decoded control information to controller/processor 440. Base station 102 may include communication unit 444 and communicate to network controller 489 via communication unit 444. Network controller 489 may include communication unit 494, controller/processor 490, and memory 492.

Controller/processor 440 of base station 102 and controller/processor 480 of UE 104 and/or any other component(s) of FIG. 4 may perform one or more techniques associated with identifying attacking devices and preventing access the attacking devices from accessing a wireless network, as described in more detail elsewhere herein. For example, controller/processor 440 of base station 102 and/or controller/processor 480 of UE 104, and/or any other component(s) of FIG. 4 may perform or direct operations of, for example, processes 1000 and 1100 of FIGS. 10 and 11, and/or other processes as described herein. Memories 442 and 482 may store data and program codes for base station 102 and UE 104, respectively. In some aspects, memory 442 and/or memory 482 and/or memory 392 may comprise a non-transitory computer-readable medium storing one or more instructions for wireless communication. For example, the one or more instructions, when executed by one or more processors of base station 102 and/or the UE 104 may perform or direct operations of, for example, processes 1000 and 1100 of FIGS. 10 and 11 and/or other processes as described herein. A scheduler 446 may schedule UEs for data transmission on the downlink and/or uplink.

As indicated above, FIG. 4 is provided as an example. Other examples may differ from what is described with regard to FIG. 4.

A location server, e.g., location server 172, and a base station 102 (e.g. an eNodeB (eNB) for LTE access or an NR NodeB (gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (which may be referred to as NPPa or NRPPa) protocol may be used to transfer such messages between a base station that is a gNodeB and a location server that is an LMF.

In 5G NR, supported positioning technologies include downlink based positioning, DL based positioning including DL-TDOA (using DL Received Signal Time Difference (RSTD) measurements) and DL-AoD (using Reference Signal Received Power (RSRP) measurements); uplink based positioning including UL-TDOA (using UL Relative Time of Arrival (RTOA) measurements) and UL-AoA (using RSRP measurements); and combined downlink and uplink based positioning including RTT with one or more neighboring base station (multi-RTT) (using RSRP measurements or Rx-Tx time difference measurements). In addition, E-CID based on radio resource management (RRM) measurements is supported in 5G NR (using RSRP measurements, or Reference Signal Received Quality (RSRQ) measurements).

During positioning using signaling in LTE and 5G NR, a UE typically acquires dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Other types of signals, i.e., signals that are not dedicated for positioning, may be used by the UE for positioning. Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel. 16 or Rel. 15) that define particular reference signals for various UE measurements and the accompanying positioning techniques.

TABLE 1

| DL/UL Reference Signals | UE Measurements | To facilitate support of the following positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx − Tx time difference | Multi-RTT |
| Rel. 15 SSB/ CSI-RS for RRM | SS-RSRP(RSRP for RRM), SS-RSRQ(for RRM), CSI-RSRP (for RRM), CSI-RSRQ (for RRM) | E-CID |

During positioning, the UL positioning reference signals that transmitted by a UE and received by one or more base stations is based on the release-15 (Rel-15) Sounding Reference Signals (SRS) with enhancements/adjustments for positioning purposes. The UL-PRS may sometimes be referred to as "SRS for positioning." A new Information Element (IE) is configured for SRS for positioning in RRC signaling. Table 2 below illustrates 3GPP release 16 measurements and positioning techniques that may use SRS for positioning.

TABLE 2

| DL/UL Reference Signals | UE Measurements | To facilitate support of the following positioning techniques |
|---|---|---|
| Rel. 16 SRS for positioning | UL RTOA | UL-TDOA |
| Rel. 16 SRS for positioning | UL SRS-RSRP | UL-TDOA, UL-AoA, Multi-RTT |
| Rel. 16 SRS for positioning, Rel. 16 DL PRS | gNB Rx − Tx time difference | Multi-RTT |
| Rel. 16 SRS for positioning | AoA and ZoA | UL-AoA, Multi-RTT |

Angle measurements, such as AoA ($\phi$) and zenith angle of arrival (ZoA ($\theta$)) define the estimated angles of a UE with respect to a reference direction which may be determined at the TRP antenna for an UL channel corresponding to the UE.

The reference direction, for example, may be defined according to the Global Coordinate System (GCS) or a Local Coordinate System (LCS). LTE supports AoA, with the use of GCS, while 5G NR supports both AoA and ZoA and both GCS and LCS. Angle of arrival (AoA), as sometimes used herein, may refer to the azimuth of arrival, the zenith of arrival, or both the azimuth and zenith of arrival.

Figure 5:
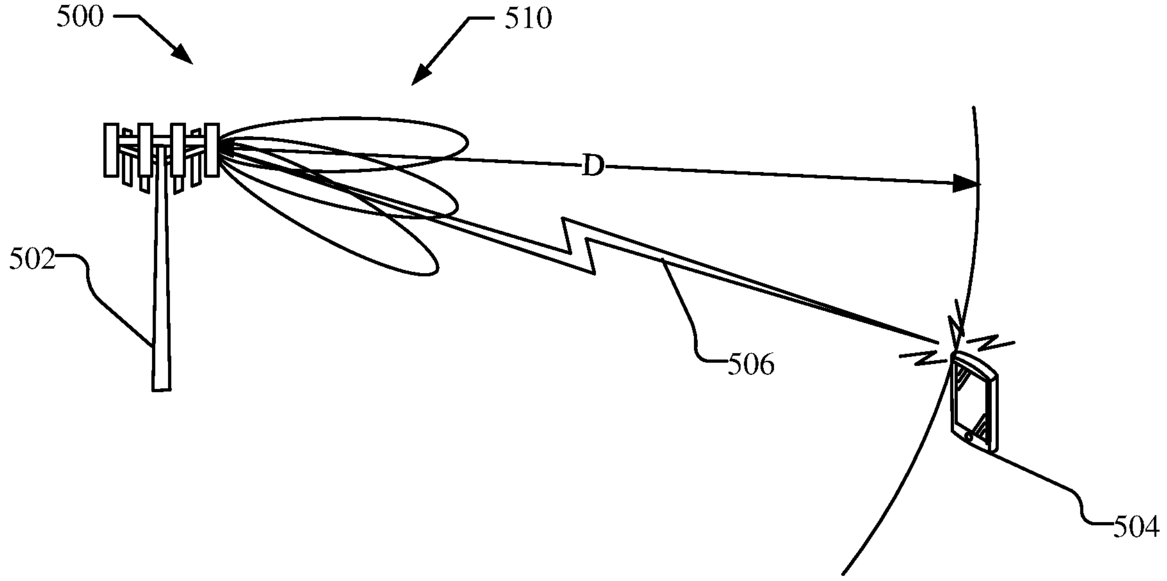
FIG. 5 illustrates an example of an uplink angle of arrival positioning procedure performed by a base station.

FIG. 5 illustrates an example of a UL-AoA positioning procedure 500 performed by a base station 502. In the example of FIG. 5, a base station 502 (e.g., any of the base stations described herein) receives one or more UL reference signals 506 (e.g., UL-PRS, SRS, DMRS, etc.) from a UE 504 (e.g., any of the UEs described herein) on a plurality of uplink receive beams 510. The base station 502 determines the angle of the best receive beams 510 used to receive the one or more reference signals from the UE 504 as the AoA from itself to the UE 504. Specifically, each of the receive beams 510 will result in a different received signal strength (e.g., RSRP, RSRQ, SINR, etc.) of the one or more reference signals at the base station 502. Further, the channel impulse response of the one or more reference signals will be smaller for receive beams 510 that are further from the actual LOS path between the base station 502 and the UE 504 than for receive beams 510 that are closer to the LOS path. Likewise, the received signal strength will be lower for receive beams 510 that are further from the LOS path than for receive beams 510 that are closer to the LOS path. As such, the base station 502 identifies the receive beam 510 that results in the highest received signal strength and the strongest channel impulse response, and estimates the angle from itself to the UE 504 as the AoA of that receive beam 510. While the AoA of the receive beam 510 resulting in the highest received signal strength and strongest channel impulse response does not necessarily lie along the LOS path, for AoA-based positioning purposes, it is assumed to do so.

The base station 502 can also estimate the distance D between itself and the UE 504, e.g., by performing an RTT positioning procedure with the UE 504 or from the timing advance for the UE 504. The timing advance is typically the RTT between a base station and a UE, or double the propagation time in one direction, and therefore, can be used to estimate the distance between the base station 502 and the UE 504 the same as an actual RTT procedure.

Based on the angle between the base station 502 and the UE 504 (based on the AoA of the best receive beam 510), knowledge of the distance D from the UE 504 to the base station 502, and the known geographic location of the base station 502, the location of the UE 504 may be estimated. A location estimate (e.g., for a UE 504) may be referred to by other names, such as a position estimate, location, position, position fix, fix, or the like. A position estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as, for example, a "location method" or as a "positioning method."

The reference direction for the AoA may be defined according to GCS or LCS. The GCS, for example, may be defined for a system comprising multiple base stations and UEs. An array antenna for a base station or a UE can be defined in an LCS. A GCS has an absolute reference frame (e.g., in terms of absolute latitude and longitude), whereas an LCS has a relative reference frame (e.g., relative to a vehicle, a base station, an antenna array, etc.). An LCS is used as a reference to define the vector far-field, that is pattern and polarization, of each antenna element in an array. It is assumed that the far-field is known in the LCS by formulae. The placement of an antenna array within the GCS is defined by the translation between the GCS and the LCS for the antenna array. The orientation of the antenna array with respect to the GCS is defined in general by a sequence of rotations (described in 3GPP Technical Specification (TS) 38.900).

As discussed herein, one or more UEs may measure the AoA of interfering signals transmitted by attacking device, such as device 112 shown in FIG. 1. The UEs may further measure the power of interfering signals. The UEs may provide an interference report to a control entity, such as a base station, which may determine wither an active attack, such as a denial of service attack, is occurring based on the interference report (and any additional interference reports received). If it is determined that an active attack is occurring, the position of the attacking device may be determined based on the interference report, e.g., based at least partly on the AoA measurements. Given the position of the attacking device, and that positions and scheduling of devices connected to the wireless network is known, the identity of the attacking device can be determined and the attacking device may be barred from joining the wireless network to prevent further attacks. In some implementations, the attacking device may be a RIS, which reflects the RF incident on its surface in a specific direction, which may be used to attack a UE by directing beams to the UE from different directions (and which may have a greater power due to the non-line of sight (NLOS) conditions). For example, shared RIS's in the network may access the network and know the slot structure and other configurations to perform smart attacks, e.g., by reflecting signals to the UE at particular times. For a RIS to reflect a signal to a certain UE, the base station has to train the beam on the RIS's surface so that the reflection is in the direction of desired UE. If the RIS is barred from accessing the network, the base station will not train a beam on the RIS, thereby making it more difficult for the RIS to align an interfering signal to the UE. If the RIS belongs to another vendor or another vendor's base station, the RIS will not be able to perform such smart jamming, but may still interfere with the reception of signals by the UE, e.g., using continuous non-smart jamming. In such cases, the RIS may not be barred from the network, but the vendor for the RIS may be reported to regulators.

Figure 6:
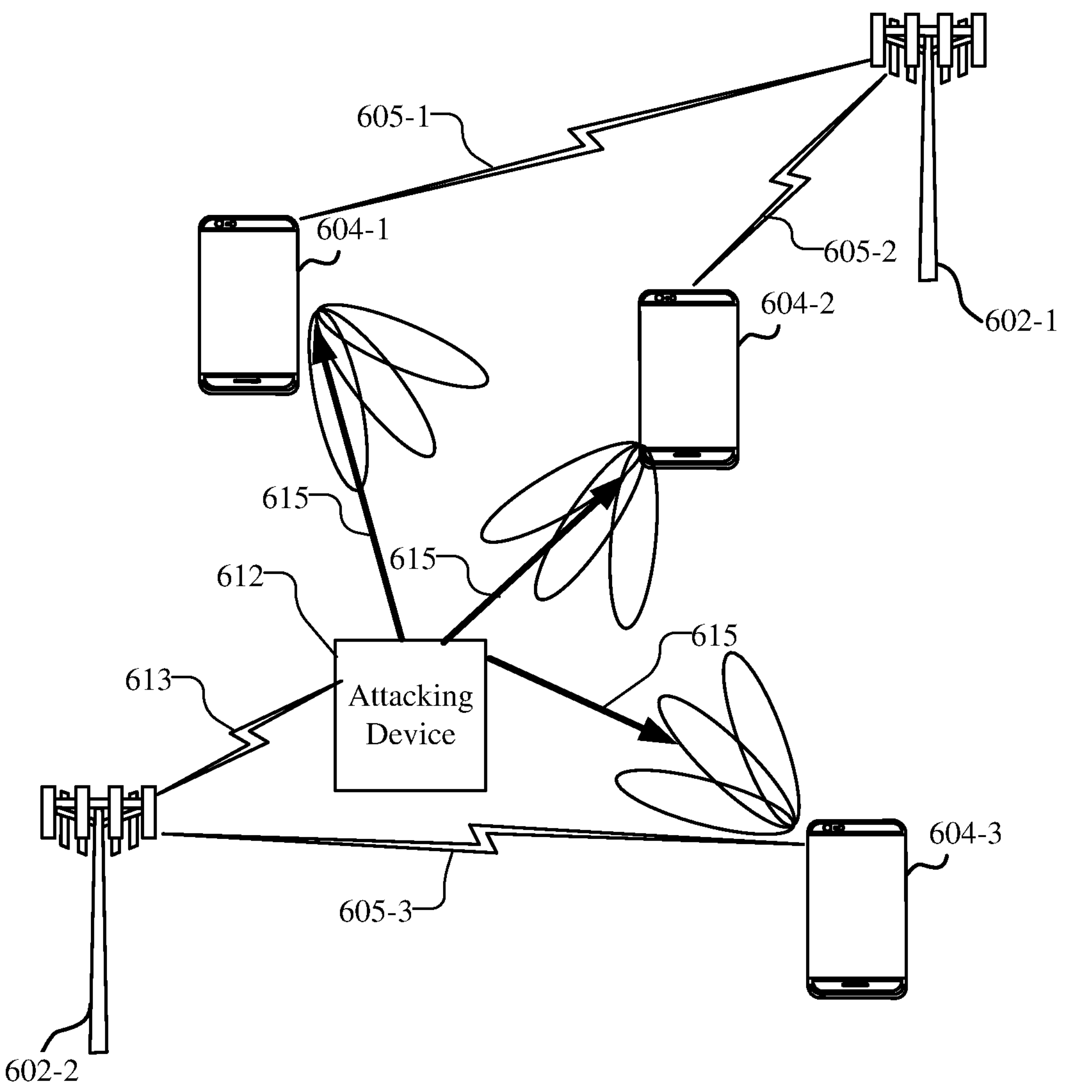
FIG. 6 illustrates an environment that includes a number of UEs receiving signals from base stations and an attacking device that transmits interfering signals.

FIG. 6, for example, illustrates an environment 600 that includes a number of UEs 604-1, 604-2, and 604-3, which may be any of the UEs described herein and are sometimes collectively referred to as UEs 604, base stations 602-1 and 602-2, which may be any of the base stations described herein and are sometimes collectively referred to as base stations 602, and an attacking device 612. The UEs 604-1 and 604-2 are illustrated as connected to base station 602-1 via channels 605-1 and 605-2, respectively, and UE 604-3 and attacking device 612 are illustrated as connected to base station 602-2 via channels 605-3 and 613, respectively.

The attacking device 612 is connected to the wireless network via base station 602-2 and is thus aware of the time and frequency resources employed for the channel by base stations 602. The attacking device 612 transmits interfering signals 615 based on the known time and frequency resources for the DL channel, which interferes with the UEs 604 reception of DL signals from base stations 602. For example, the attacking device 612 may determine a downlink control region (e.g., time and/or frequency resources allocated for downlink control information for one or more base stations 602) of the wireless network. In some instances, the attacking device 612 may determine that downlink control information is scheduled based on the system bandwidth. For example, downlink control information for one or more base stations 602 may be scheduled to be transmitted in a first time slot at one end of the system bandwidth and/or in a second time slot (e.g., a time slot consecutive to the first time slot) at the other end of the system bandwidth. By determining the resources (resource elements (REs), resource blocks (RBs), component carriers (CCs), subcarriers, time slots, symbols, etc.) allocated for downlink control information, the attacking device 612 may then transmit signals within coverage area and/or towards a UE 604 to overload or otherwise interfere with the allocated downlink resources from base stations 602 of the wireless communications system 100. Thus, the attacking device 612 may jeopardize the reception and/or transmission of critical messages, channels, and/or timings between one or more base stations 602 and one or more UEs 604.

One or more of the UEs 604 may detect the interfering signals 615 transmitted by the attacking device 612. For example, interfering signals 615 may be detected by the UEs 604 based on the reception of signals at times and frequencies allocated to downlink signals from base stations 602. The interfering signals 615, for example, may be transmitted/broadcast at high power to mask the downlink signals transmitted by the base stations 602, and thus, signals received with a power greater than a predetermined threshold at times and frequencies allocated for downlink signals may be interpreted as an interfering signal.

Upon detection of interfering signals 615, the UEs 604 may determine the angle of arrival of the transmissions, e.g., as discussed above. For example, the UEs 604 may determine the angle of the best receive beam used to receive the interfering signals from the attacking device 612, e.g., based on the highest received signal strength (e.g., RSRP, RSRQ, SINR, etc.) for different receive beams. The UEs 604 may thus identify the receive beam that results in the highest received signal strength and the strongest channel impulse response, and estimate the angle from itself to the attacking device 612 as the AoA of that receive beam. The reference direction for the AoA may be defined according to GCS or LCS. The UE 604 may further determine the signal strength of the interfering signal 615. In some implementations, the power information may include eigenvalues for the power of the interfering signals, an interference pattern in time and frequency of the interfering signals, or a combination thereof. In some implementations, one or more base stations 602 may likewise receive interfering signals from the attacking device 612 and may likewise determine the AoA and signal strength of the interfering signal.

The UEs 604 (and any base stations 602) may generate an interference report that includes the AoA and in some implementations, the signal strength of the interfering beam along with control information, such as a time stamp and frequency information. The UEs 604 (and any base stations 602) may send the interference report to a control server, which will determine whether an active attack on the wireless network is occurring. The control server, for example, may be a base station such as base station 602-1, or may be a server in the core network 170 (shown in FIG. 1) or a location server 172.

The control server, e.g., base station 602-1 in the present example, may receive interference reports from a plurality of sources, e.g., UEs 604-1 and 604-2. Moreover, base stations 602-1 and 602-2 may communicate with each other via X2 and/or Xn interfaces, and may share interference reports. For example, UE 604-3 may send an interference report to base station 602-2, which may provide the interference report to the control server (base station 602-1). By collecting one or more interference reports, the location of the attacking device 612 may be determined, or at least an approximate area of potential attacking devices. For example, as discussed above, with a reported AoA and indication of distance, and known location of the receiving device, the position of the transmitting device may be determined. In the present instance, measured AoA and location of the one or more UEs 604 are known, and the signal strength measurement for the interfering signal 615 may serve as a rough indication of distance, particularly where multiple UEs 604 report the measured signal strengths, which may be used as an indication of relative distance to the multiple UEs 604. If multiple interference reports are received, e.g., two or more interference reports, the intersection of the AoAs from the locations of the reporting UEs 604 may be used to determine the position of the attacking device 612.

The base stations 602 are aware of the locations of UEs and scheduling for the UEs in the network. Accordingly, control server (base station 602-1) may determine which device is transmitting the reported interfering signals 615 and may determine if the transmissions are, in fact, jamming signals from an active attack on the network. The control server (base station 602-1), for example, determine that attacking device 612 is transmitting interfering signals 615. The control server (base station 602-1) may determine (or a collection of base stations 602-1 may collectively determine) that attacking device 612 is to be barred from the wireless network and share this information with other base stations 602. For example, the attacking device 612 may be identified using an identifier, such as a Permanent Equipment Identifier (PEI) or the Subscription Permanent Identifier (SUPI), or Globally Unique Temporary Identifier (GUTI), and the access to the wireless network with that identifier may be barred. In some implementations, the attacking device may be reported to one or more different entities, such as other base stations or regulators. For example, the attacking device may be a RIS, which may be barred from the network to prevent smart attacks or the RIS (or the vendor for the RIS) may be reported to regulators.

Figure 7:
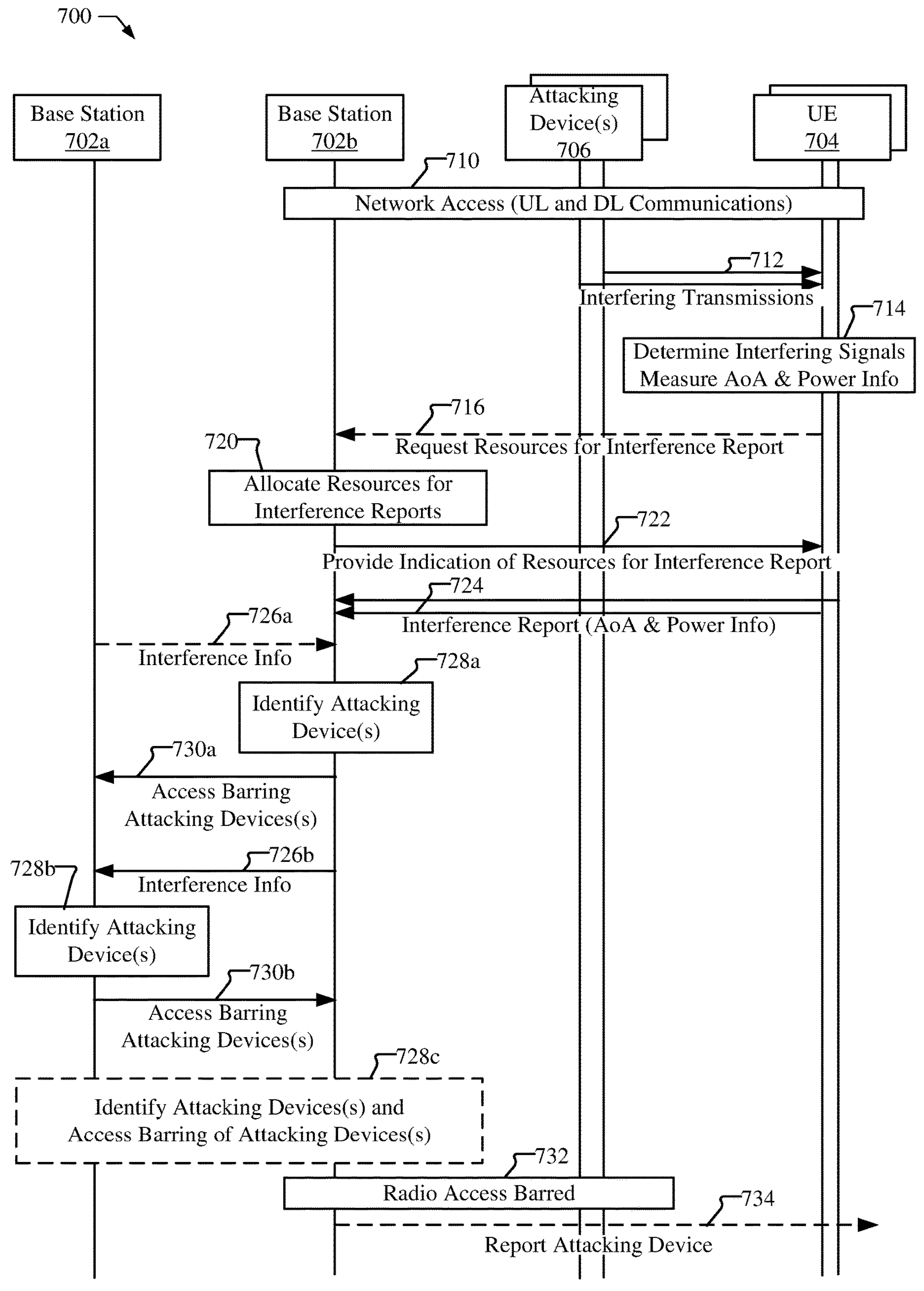
FIG. 7 is a message flow illustrating the messaging in a wireless network to detect an active attack, such as denial of services, and barring one or more attacking devices from the wireless network.

FIG. 7 is a message flow 700 illustrating the messaging in a wireless network to detect an active attack, such as denial of services, and barring one or more attacking devices 706 from the wireless network. The message flow 700, for example, illustrates messages between one or more UEs 704, which may be any of the UEs discussed herein, and one or more base stations 702*a* and 702*b* (sometimes collectively referred to as base stations 702*a*), where base station 702*a* may act as a control server and may be sometimes referred to as control server 702*a*. In some implementations, the control server may be separate from the base station, and may be located in the RAN or the core network. While two base stations 702*a* and 702*b* are illustrated, it should be understood that additional (or fewer) base stations may be used. It should be understood that messages related to the detection and barring of attacking devices are illustrated, but that additional messages, including conventional messages, may be used in the message flow 700.

Stage 710 illustrates network access with the base station 702*b* by the one or more UEs 704 and one or more attacking device 706. During network access the uplink and downlink control information for communications is provided including, e.g., timing and frequency resources, such as REs, RBs, CCs, subcarriers, time slots, symbols, etc., allocated for downlink control information. In some implementations, the UEs 704 may be requested by the base station 702*b* to send interference reports, consisting of AoA, and optionally power information, of detected interfering signals. The base station may allocate uplink control information (UCI) resources for the UEs 704 to send interference reports, e.g., at specific times or periodically, e.g., as illustrated at stage 720.

At stage 712, the one or more attacking device 706 transmit interfering signals that are received by one or more UEs 704*s* and that interfere with downlink transmissions from base station 702*b*.

At stage 714, the UEs 704 determine whether interfering signals are received, e.g., based on signals received at times and frequencies allocated to the base station 702*b* with signal strength that exceeds a predetermined threshold. The UEs 704 measure the AoA of the interfering signals and power information, such as signal strength (RSRP, RSRQ, SINR, etc.) as discussed in FIGS. 5 and 6. In some implementations, the power information may include eigenvalues for the power of the interfering signals, an interference pattern in time and frequency of the interfering signals, or a combination thereof.

At stage 716, in some implementations, if the UEs 704 detected interfering signals, the UEs 704 may request resources to send interference reports, e.g., if the base station 702*b* did not request interference reports at stage 710. Each UE 704, for example, may request resources for sending an interference report if the UE detects a predetermined number of instances of interfering signals over a predetermined amount of time. The request for resources, for example, may indicate the number of interfering signals and/or sources of interfering signals that the UE 704 detected so that the size of resources for the interference report may be appropriately allocated.

At stage 720, the base station 702*b* allocates resources, e.g., UCI resources, for the UEs 704 to send interference reports. The allocation of resources for the interference reports may be in response to the request for resources at stage 716 or may be for interference reports that the UEs 704 were instructed to send at specific times or periodically, e.g., in stage 710. The allocation of resources may be configured for all of the sources and/or number of interfering signals or for less than all of the sources and/or number of interfering signals.

At stage 722, the base station 702*b* sends to the one or more UEs 704 an indication of the resources that have been allocated for interference reports to the one or more UEs 704, e.g., in a downlink control information (DCI) message.

At stage 724, the one or more UEs may send interference reports to the base station 702*b* using the resources allocated, as indicated in stage 722. The interference reports include the AoA measurements for the interfering signals and may include power information, such as the signal strength of the interfering signals. The interference reports may further include information to identify the interfering signals, such as time stamps and frequencies. The interference reports may further include position information for each UE 704 if known.

At stage 726*a*, the base station 702*a* may send interference reports it has received from one or more UEs (not shown) to base station 702*b*, which may act as a control server, or to a separate control server (not shown), e.g., using an X2 interface for LTE or an Xn interface for NR. The base station 702*a* may append the interference reports to include position information for each reporting UE, if it is not included in the interference report. In some implementations, the base station 702*b* may similarly send all interference reports it has received to the base station 702*a*.

At stage 728*a*, the base station 702*b* may identify one or more attacking devices 706 based on the interference reports it has received, e.g., at stages 724 and optional stage 726*a*, and the known positions of the attacking devices 706. For example, the base station 702*b* may use the AoA measurements and positions of reporting UEs 704, which may be known from the interference reports, and optionally any AoA measurements and positions of reporting UEs as received from the base station 702*a* in stage 726*a*, to determine the positions of the attacking devices. In some implementations, the measured signal strength in the interference reports may be used as an indication of distance between an attacking device and the position of the reporting UE 704. The AoA measurement from the position of the UE 704 may be used with the approximate distance to the attacking device to determine an approximate position of the attacking device. In some implementations, if multiple interference reports are received for the same interfering signal (e.g., based on corresponding time stamps and frequencies), the measured signal strengths may provide an indication of relative distances between the UEs 704, which may be used along with the AoA measurements from the positions of the reporting UEs to determine an approximate position of the attacking device. In some implementations, if multiple interference reports are received, e.g., two or more reports, the intersection of the AoAs from the positions of the reporting UEs may be used to determine the position of the attacking device. Using the determined position of the attacking device and known positions of devices connected to the network, the attacking device(s) 706 may identified. Further, based on uplink scheduling associated with the attacking device(s) 706, the base station 702*b* may determine whether the attacking device(s) 706 are in fact engaged in an active attack by transmitting interfering signals. The base station 702*b* may determine to bar access of the one or more attacking devices 706 to the wireless network if the attacking devices 706 are determined to be engaged in an active attack on the network.

At stage 730*a*, the base station 702*b* may send a message to other base stations, such as base station 702*a*, to bar access to the wireless network by the one or more attacking device(s) 706. The message, for example, may include an identifier, e.g., the PEI, for the attacking device(s) 706 and an indication that the attacking device(s) are to be barred from the network.

Additionally or alternatively, the base station 702*b* may provide interference reports to another network entity, e.g., base station 702*a*, or may cooperatively coordinate with another network entity, e.g., base station 702*a*, to determine whether the attacking devices are in fact engaged in an active attack and, if so, bar the attacking device from accessing the network.

For example, at stage 726*b*, the base station 702*b* may send interference reports it has received from one or more UEs 704, to a network entity, such as another base station 702*a*, which may act as a control server, or to a separate control server (not shown), e.g., using an X2 interface for LTE or an Xn interface for NR. The base station 702*b* may append the interference report to include position information for each reporting UE 704, if it is not included in the interference report. In some implementations, the base station 702*a* may similarly send all interference reports it has received to the base station 702*b*, and the base stations 702*b* and 702*a* may independently determine whether the attacking devices are in fact engaged in an active attack and, if so, bar the attacking device from accessing the network.

At stage 728*b*, similar to stage 728*a* discussed above, the base station 702*a* may identify one or more attacking devices 706 based on the interference reports it has received from base station 702*b* at stage 726*b*, as well as any interference reports that it independently receives from UEs, and the known position of the attacking devices 706. For example, the base station 702*a* may use the AoA measurements and positions of reporting UEs 704, which may be known from the interference reports, to determine the position of the attacking devices. In some implementations, the measured signal strength in the interference reports may be used as an indication of distance between an attacking device and the position of the reporting UE 704. The AoA measurement from the position of the UE 704 may be used with the approximate distance to the attacking device to determine an approximate position of the attacking device. In some implementations, if multiple interference reports are received for the same interfering signal (e.g., based on corresponding time stamps and frequencies), the measured signal strengths may provide an indication of relative distances between the UEs 704, which may be used along with the AoA measurements from the positions of the reporting UEs to determine an approximate position of the attacking device. In some implementations, if multiple interference reports are received, e.g., two or more reports, the intersection of the AoAs from the positions of the reporting UEs may be used to determine the position of the attacking device. Using the determined position of the attacking device and known positions of devices connected to the network, the attacking device(s) 706 may identified. Further, based on uplink scheduling associated with the attacking device(s) 706, the base station 702*a* may determine whether the attacking device(s) 706 are in fact engaged in an active attack by transmitting interfering signals. The base station 702*a* may determine to bar access of the one or more attacking devices 706 to the wireless network if the attacking devices 706 are determined to be engaged in an active attack on the network.

At stage 730*b*, the base station 702*a* sends a message to other base stations, such as base station 702*b*, to bar access to the wireless network by the one or more attacking device(s) 706. The message, for example, may include an identifier, e.g., the PEI, for the attacking device(s) 706 and an indication that the attacking device(s) are to be barred from the network.

At stage 728*c*, instead of stages 728*a*, 730*a* and/or stages 728*b* 730*b*, in some implementations, the base stations 702*b* and 702*a* may cooperatively determine whether the attacking device(s) 706 are engaged in an active attack, similar to the discussion in stages 728*a* and 728*b*, and whether the attacking device(s) 706 are to be barred from the network, as discussed in stages 730*a* and 730*b*.

At stage 732, base station 702*b* bars the one or more attacking devices 706 from radio access based on the identifiers of the one or more attacking devices 706 determined and communicated to other base stations in stages 728*a*, 730*a*, and/or stages 728*b*, 730*b*, and/or stages 728*c*.

At stage 734, which may be performed in addition to, or in alternative to barring the one or more attacking devices 706, the base station 702*b* (and/or base station 702*a*) may send a report message to one or more other entities, such as other base stations or core network entities, e.g., an AMF, etc., or to regulators, indicating the attacking device(s) are engaged in an active security attack. For example, as discussed above, if the attacking device(s) is an RIS, the RIS may be barred from the network to prevent smart attacks or the RIS (or the vendor for the RIS) may be reported to regulators.

Figure 8:
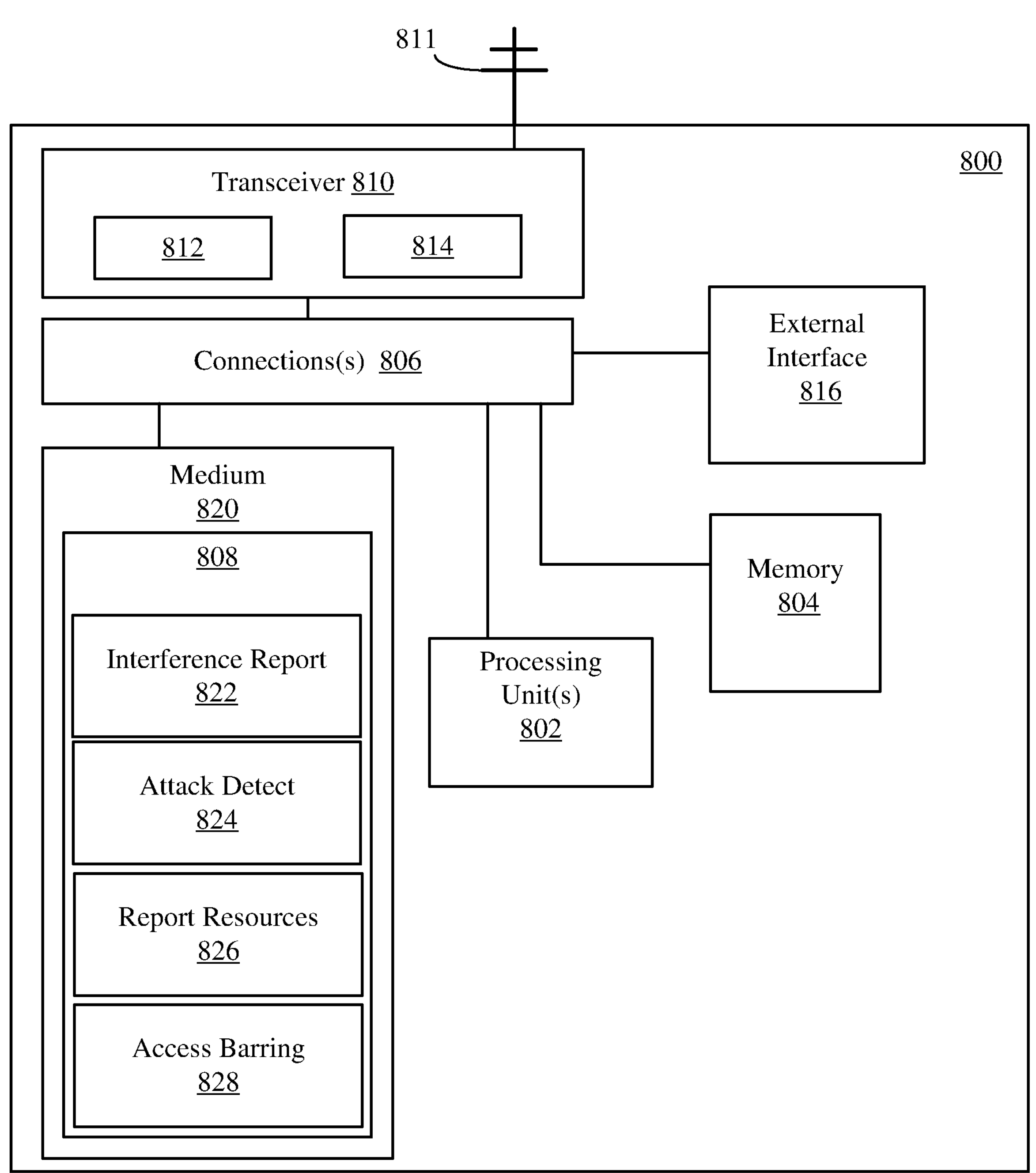
FIG. 8 shows a schematic block diagram illustrating certain exemplary features of a base station enabled to support the identification and prevention of active security attacks in a wireless network.

FIG. 8 shows a schematic block diagram illustrating certain exemplary features of a base station 800, e.g., a base station 102 in FIGS. 1 and 4, gNB 222 or 322 in FIGS. 2 and 3, eNB 224 or 324 in FIGS. 2 and 3, base station 602 in FIG. 6, base stations 702*a* or 702*b* in FIG. 7, enabled to support the identification and prevention of active security attacks in a wireless network, as described herein. The base station 800 may be an eNB or gNB. The base station 800 may perform the message flow shown in FIG. 7 and the process flow shown in FIG. 10, and supporting algorithms as discussed herein. Base station 800 may, for example, include one or more processors 802, memory 804, a transceiver 810 (e.g., wireless network interface) and an external interface 816 (e.g., wireline or wireless network interface, such as an X2 or Xn interface, to other base stations and/or entities in the core network such as a location server), which may be operatively coupled with one or more connections 806 (e.g., buses, lines, fibers, links, etc.) to non-transitory computer readable medium 820 and memory 804. The base station 800 may further include additional items. For example, the external interface may further include an interface with an operator, which may include e.g., a display, a keypad or other input device, such as virtual keypad on the display, through which an operator may interface with the base station. In certain example implementations, all or part of base station 800 may take the form of a chipset, and/or the like. Transceiver 810 may, for example, include a transmitter 812 enabled to transmit one or more signals over one or more types of wireless communication networks and a receiver 814 to receive one or more signals transmitted over the one or more types of wireless communication networks.

In some embodiments, base station 800 may include antenna 811, which may be used to transmit and/or receive signals processed by transceiver 810. In some embodiments, antenna 811 may be coupled to transceiver 810. In some embodiments, measurements of signals received (transmitted) by base station 800 may be performed at the point of connection of the antenna 811 and transceiver 810. For example, the measurement point of reference for received (transmitted) RF signal measurements may be an input (output) terminal of the receiver 814 (transmitter 812) and an output (input) terminal of the antenna 811. In a base station 800 with multiple antennas 811 or antenna arrays, the antenna connector may be viewed as a virtual point representing the aggregate output (input) of multiple antennas. In some embodiments, base station 800 may measure received signals including signal strength and TOA measurements and the raw measurements may be processed by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of base station 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in base station 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors. A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in base station 800 is merely exemplary, and as such the functionality of the modules and/or data structures may be combined, separated, and/or be structured in different ways depending upon the implementation of the base station 800.

The medium 820 and/or memory 804 may include an interference report module 822 that when implemented by the one or more processors 802 configures the one or more processors 802 to receive, via the transceiver 810 or the external interface 816, one or more interference reports that may include AoA and power information, such as signal strength, measured by the UE for one or more interfering signals transmitted by an attacking device. The one or more processors 802 may be configured to receive the interference report from one or more UEs directly, e.g., via the transceiver 810, or by other base stations, via the external interface 816. The one or more processors 802 further may be configured to send, via the external interface 816 one or more interference reports to other base stations.

The medium 820 and/or memory 804 may include an attack detect module 824 that when implemented by the one or more processors 802 configures the one or more processors 802 to determines whether a device is engaged in an active security attack in the wireless network based at least in part on the AoA and power information received in one or more interference reports. For example, the one or more processors 802 may be configured to the measured signal strength as an indication of distance between the attacking device and the position of the reporting UEs or a relative distance measurement for multiple reporting UEs. The AoA measurement from known positions of the UEs may be used with the approximate distance to the attacking device and/or other AoA measurements from known positions of other UEs to determine an approximate position of the attacking device and to identify the attacking device. The one or more processors 802 may be configured to further use uplink scheduling associated with the attacking device to determine whether interfering signals transmitted by the device were an active attack on the wireless network. The one or more processors 802 may be configured to communicate, via the external interface 816, with other base stations and to determine collectively whether the attacking device is engaged in the active security attack in the wireless network.

The medium 820 and/or memory 804 may include a report resources module 826 that when implemented by the one or more processors 802 configures the one or more processors 802 to allocate resource for one or more UEs to send interference reports, e.g., via a UCI message, and to send to the UEs, via the transceiver 810, the allocation of resources for the interference reports, e.g., via a DCI message. The one or more processors 802 may be configured to receive, via the transceiver 810, a request from the UE to allocate resources for the interference report. The request, for example, may include the number of sources of interfering signals that are detected by the UE. The one or more processors 802 may be configured to allocate resources for each source of interfering signals or for less than all of the detected sources of interfering signals.

The medium 820 and/or memory 804 may include an access barring module 828 that when implemented by the one or more processors 802 configures the one or more processors 802 to bar access to the wireless network by a device when it is determined that the device is actively attacking the wireless network, e.g., via the wireless transceiver 810. The one or more processors 802 may be configured to receive instructions to bar access to the device from another base station based on an identifier for the devices such as PEI, SUPI, or GUTI, via the external interface 816 or to identify the attacking device using a unique ID, such as PEI, SUPI, or GUTI, and send instructions to bar access the device with the unique ID to another base station, via the external interface 816. In some implementations, the one or more processors 802 may be additionally or alternatively configured to report the device to one or more other entities, such as other base stations or core network entities, e.g., an AMF, etc., or to regulators, e.g., if the attacking device is an RIS for another network vendor.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support identifying and preventing active security attacks in a wireless network using positioning measurements in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
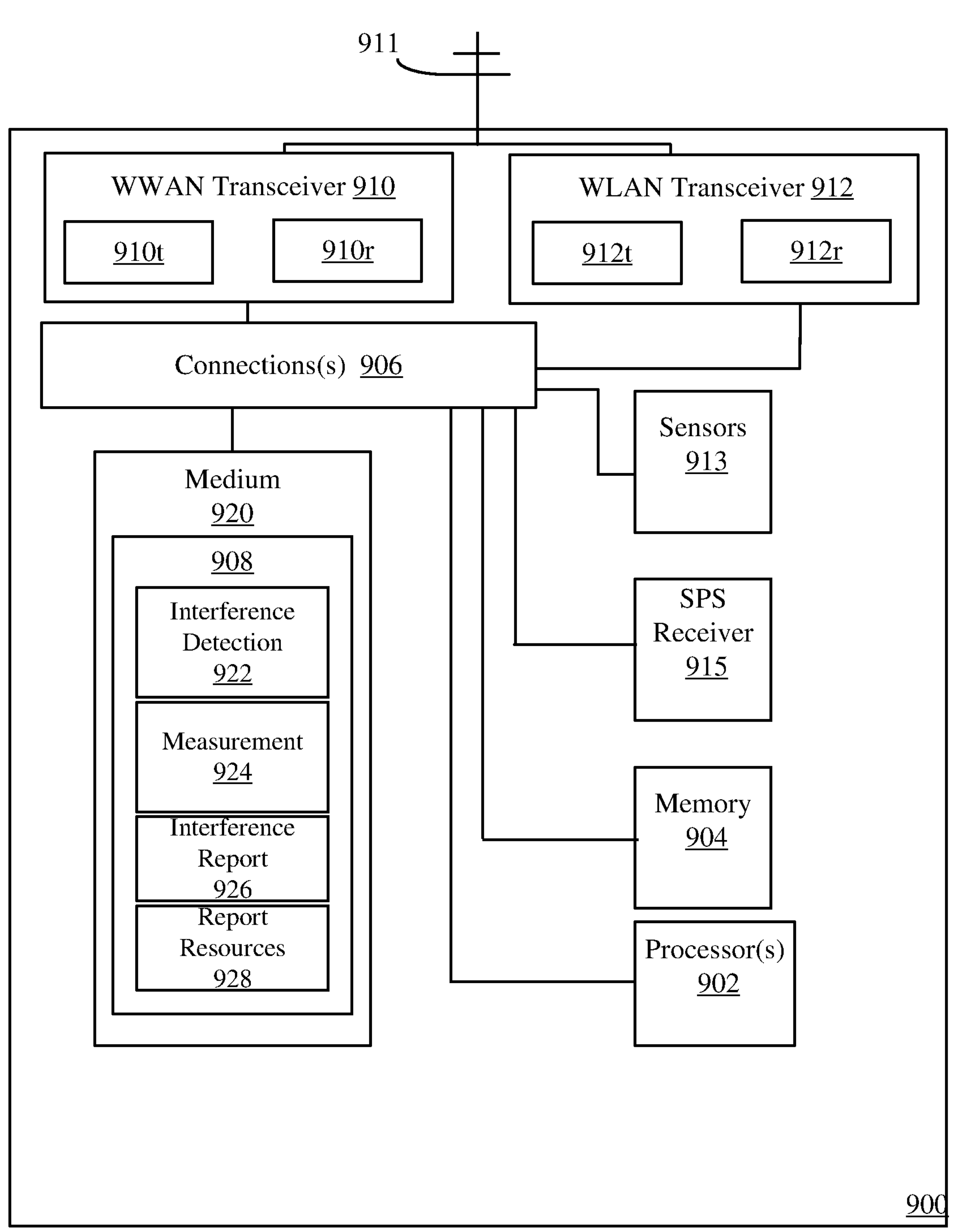
FIG. 9 shows a schematic block diagram illustrating certain exemplary features of a UE enabled to support the identification and prevention of active security attacks in a wireless network.

FIG. 9 shows a schematic block diagram illustrating certain exemplary features of a UE 900, e.g., which may be a UE that receives revised assistance data, such as UE 104 in FIGS. 1 and 4, UEs 204 or 304 in FIGS. 2 and 3, UE 604 in FIG. 6, or UE 704 in FIG. 7, enabled to support the identification and prevention of active security attacks in a wireless network, as described herein. The UE 900 may perform the message flow shown in FIG. 7 and the process flow shown in FIG. 11, and supporting algorithms as discussed herein. The UE 900 may, for example, include one or more processors 902, memory 904, an external interface such as at least one wireless transceivers (e.g., wireless network interface) illustrated as WWAN transceiver 910 and WLAN transceiver 912, satellite positioning system (SPS) receiver 915, and one or more sensors 913, which may be operatively coupled with one or more connections 906 (e.g., buses, lines, fibers, links, etc.) to non-transitory computer readable medium 920 and memory 904. The SPS receiver 915, for example, may receive and process SPS signals from satellite vehicles (SVs). The one or more sensors 913, for example, may be an inertial measurement unit (IMU) that may include one or more accelerometers, one or more gyroscopes, a magnetometer, etc. The UE 900 may further include additional items, which are not shown, such as a user interface that may include e.g., a display, a keypad or other input device, such as virtual keypad on the display, through which a user may interface with the UE. In certain example implementations, all or part of UE 900 may take the form of a chipset, and/or the like.

The UE 900 may include at least one wireless transceiver, such as transceiver 910 for a WWAN communication system and transceiver 912 for a WLAN communication system, or a combined a transceiver for both WWAN and WLAN. The WWAN transceiver 910 may include a transmitter **910*t* and receiver 910*r* coupled to one or more antennas 911 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 912 may include a transmitter 912*t* and receiver 912*r* coupled to one or more antennas 911 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 910*t* and 912*t* may include multiple transmitters that may be discrete components or combined/integrated components, and/or the receivers 910*r* and 912*r* may include multiple receivers that may be discrete components or combined/integrated components. The WWAN transceiver 910 may be configured to communicate signals (e.g., with base stations and/or one or more other devices) according to a variety of radio access technologies (RATs) such as 9G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHZ frequencies. The WLAN transceiver 912 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The transceivers 910 and 912 may be communicatively coupled to a transceiver interface, e.g., by optical and/or electrical connection, which may be at least partially integrated with the transceivers 910 and 912**.

In some embodiments, UE 900 may include antenna 911, which may be internal or external. UE antenna 911 may be used to transmit and/or receive signals processed by wireless transceivers 910 and 912. The antenna 911 may include an antenna array, which may be capable of receive beamforming, e.g., by increasing the gain setting and/or adjust the phase setting of an array of antennas in a particular direction to amplify (e.g., to increase the gain level of) the RF signals received from that direction. The antenna 911 may further include a plurality of antenna panels, wherein each antenna panel is capable of beamforming. The antenna 911 is capable of adaptation, e.g., selection of one or more antennas for controlling receiving transmitted beams from a base station. A reduced number of beams or a single beam, for example, may be selected for reception of a wide angle beam, e.g., to reduce power consumption, while an increased number of antennas in an antenna array may be selected when the transmit beam is relatively narrow. In some embodiments, UE antenna 911 may be coupled to wireless transceivers 910 and 912. In some embodiments, measurements of signals received (transmitted) by UE 900 may be performed at the point of connection of the UE antenna 911 and wireless transceivers 910 and 912. For example, the measurement point of reference for received (transmitted) RF signal measurements may be an input (output) terminal of the receiver 910*r* (transmitter 910*t*) and an output (input) terminal of the UE antenna 911. In a UE 900 with multiple UE antennas 911 or antenna arrays, the antenna connector may be viewed as a virtual point representing the aggregate output (input) of multiple UE antennas. In some embodiments, UE 900 may measure received signals including signal strength and TOA measurements, and angle related measurements for DL PRS and/or SL PRS and the raw measurements may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in UE 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 900 is merely exemplary, and as such the functionality of the modules and/or data structures may be combined, separated, and/or be structured in different ways depending upon the implementation of the UE 900.

The medium 920 and/or memory 904 may include an interference detection module 922 that when implemented by the one or more processors 902 configures the one or more processors 902 to detect interfering signals transmitted by an attacking device, which interfere with downlink transmissions from a base station. The one or more processors 902, for example, may be configured to detect interfering signals based on the reception of signals at times and frequencies allocated to downlink signals from a base station. The one or more processors 902 may further detect an interfering signal based on the power (e.g., signal strength) of the interfering signal being greater than a predetermined threshold power.

The medium 920 and/or memory 904 may include a measurement module 924 that when implemented by the one or more processors 902 configures the one or more processors 902 to measure the AoA of the interfering signal, e.g., based on the receiving beamforming with antenna 911, e.g., by increasing the gain setting and/or adjust the phase setting of an array of antennas in a particular direction to amplify (e.g., to increase the gain level of) the RF signals received from that direction. The one or more processors 902 may be further configured to convert the angle measurement measured by the antenna 911 to a reference direction, which may be GCS or LCS, based on the orientation of the UE 900 with respect to the reference direction, e.g., as measured by one or more sensors 913, such as a magnetometer, gyroscope, etc. If there are multiple sources of interfering signals, the one or more processors 902 determine the number of sources of interfering signals, for example, based on the number of different AoAs for interfering signals. The one or more processor 902 may be further configured to measure power information of the interfering signals, such as RSRP, RSRQ, SINR, etc., and may further measure one or more of the eigenvalues for the power of the interfering signals, an interference pattern in time and frequency of the interfering signals, or a combination thereof.

The medium 920 and/or memory 904 may include an interference report module 926 that when implemented by the one or more processors 902 configures the one or more processors 902 to send, via the transceiver 910, an interference report to the base station, the interference report comprising the AoA and power information for the interfering signals.

The medium 920 and/or memory 904 may include a report resources module 928 that when implemented by the one or more processors 902 configures the one or more processors 902 to receive, via the transceiver 910, an allocation of resources for the interference report from the base station, wherein the interference report is sent using the allocation of resources. The allocation of resources, for example, may be received in a DCI message from the base station. In some implementations, the one or more processors 902 may be configured UE may send, via the transceiver 910, to the base station a request for the allocation of resources for the interference report. For example, the request for the allocation of resources may include a number of sources of interfering signals that is detected by the UE. The allocation of resources received from the base station may be configured for interference reports for each source of interfering signals. In another example, the allocation of resources received from the base station may be configured for interference reports for less than all of the sources of interfering signals.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support identifying and preventing active security attacks in a wireless network using positioning measurements in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

Figure 10:
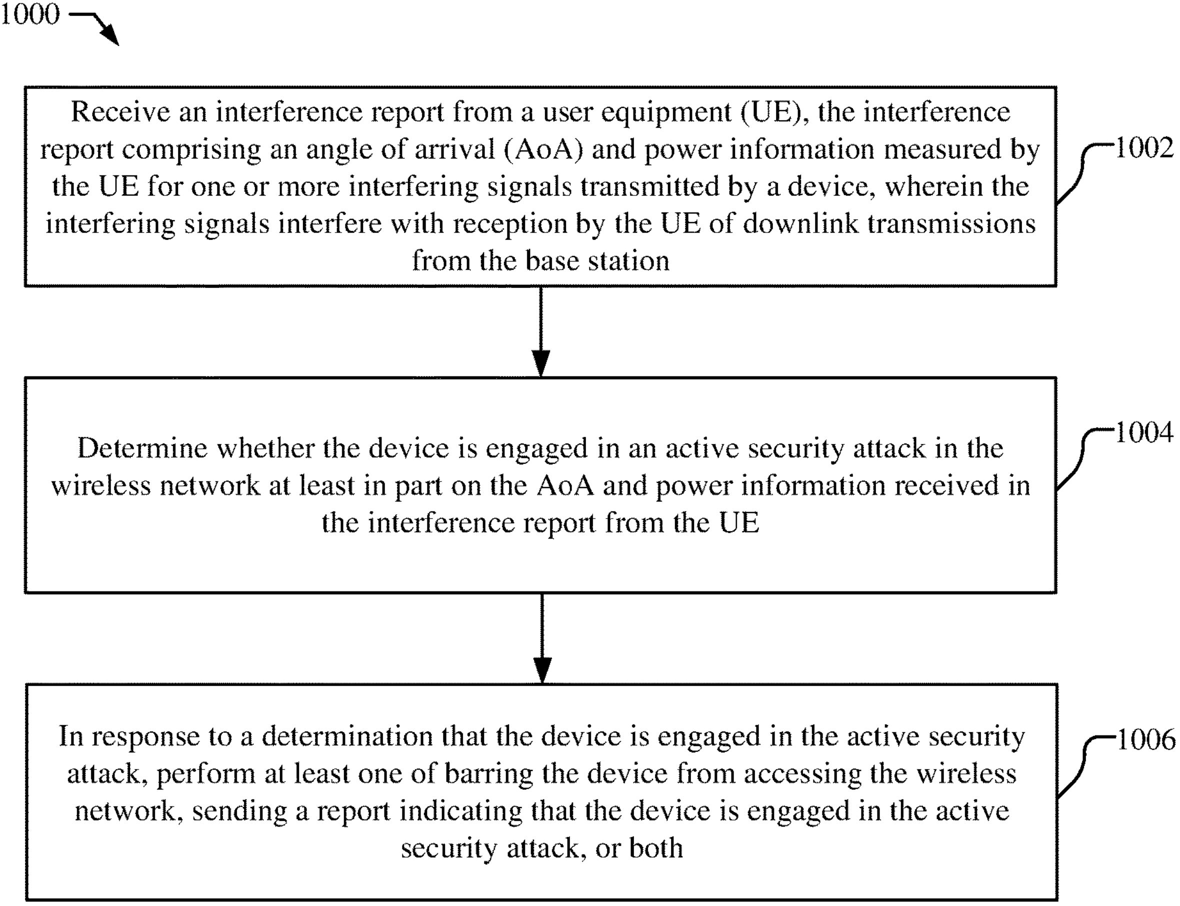
FIG. 10 shows a flow diagram for an exemplary method performed by a base station in a wireless network for preventing active security attacks in the wireless network.

FIG. 10 shows a flow diagram for an exemplary method 1000 performed by a base station in a wireless network for preventing active security attacks in the wireless network. The base station, for example, may be a base station 102, gNB 222 or 322, eNB 224 or 324, base station 602, 702*a*, 800.

At block 1002, the base station receives an interference report from a user equipment (UE), the interference report including an angle of arrival (AoA) and power information measured by the UE for one or more interfering signals transmitted by a device, wherein the interfering signals interfere with reception by the UE of downlink transmissions from the base station, e.g., as discussed at stages 724 and 726*a* or 726*b* of FIG. 7. The UE, for example, may be, e.g., a UE 104, 204, 304, 604, 704, or 900. The power information, for example, may be a measured strength of the interfering signal. In some implementations, the power information may additionally comprise at least one of eigenvalues for the power of the one or more interfering signals, an interference pattern in time and frequency of the one or more interfering signals, or a combination thereof. A means for receiving an interference report from a user equipment (UE), the interference report including an angle of arrival (AoA) and power information measured by the UE for one or more interfering signals transmitted by a device, wherein the interfering signals interfere with reception by the UE of downlink transmissions from the base station may include, e.g., the transceiver 810 and/or external interface 816 and one or more processors 802 with dedicated hardware or implementing executable code or software instructions in memory 804 and/or medium 820 in base station 800, such as the interference report module 822, shown in FIG. 8.

At block 1004, the base station determines whether the device is engaged in an active security attack in the wireless network based at least in part on the AoA and power information received in the interference report from the UE, e.g., as discussed at stages 728*a*, 728*b*, or 728*c* of FIG. 7. A means for determining whether the device is engaged in an active security attack in the wireless network based at least in part on the AoA and power information received in the interference report from the UE may include, e.g., the transceiver 810 and/or external interface 816 and one or more processors 802 with dedicated hardware or implementing executable code or software instructions in memory 804 and/or medium 820 in base station 800, such as the attack detect module 824, shown in FIG. 8.

At block 1006, in response to a determination that the device is engaged in the active security attack, the base station may perform at least one of barring the device from accessing the wireless network, sending a report indicating that the device is engaged in the active security attack, or both, e.g., as discussed at stages 728*a*, 730*a*, 728*b*, 730*b*, 728*c*, 732, and 734 of FIG. 7. A means for barring that bars the device from accessing the wireless network may include, e.g., the transceiver 810 and/or external interface 816 and one or more processors 802 with dedicated hardware or implementing executable code or software instructions in memory 804 and/or medium 820 in base station 800, such as the access barring module 828, shown in FIG. 8. A means for reporting that sends a report indicating that the device is engaged in the active security attack may include, e.g., the transceiver 810 and/or external interface 816 and one or more processors 802 with dedicated hardware or implementing executable code or software instructions in memory 804 and/or medium 820 in base station 800, such as the access barring module 828, shown in FIG. 8.

In one implementation, the base station may configure an allocation of resources for the UE to send the interference report, e.g., as discussed at stage 720 of FIG. 7. The base station may send to the UE an indication of the allocation of resources for the interference report, wherein the interference report is received based on the allocation of resources, e.g., as discussed at stages 722 and 724 of FIG. 7. In some implementations, the base station may receive from the UE a request for the allocation of resources for the interference report, wherein the indication of the allocation of resources is sent to the UE in response to the request of the allocation of resources, e.g., as discussed at stage 716 of FIG. 7. The request for the allocation of resources, for example, may include a number of sources of interfering signals detected by the UE. In some implementations, the allocation of resources may be configured for interference reports for each source of interfering signals detected by the UE. In some implementations the allocation of resources may be configured for interference reports for less than all of the sources of interfering signals detected by the UE. The indication of the allocation of resources for the interference report, for example, may be sent to the UE in a Downlink Control Information (DCI) message. A means for configuring an allocation of resources for the UE to send the interference report may include, e.g., the one or more processors 802 with dedicated hardware or implementing executable code or software instructions in memory 804 and/or medium 820 in base station 800, such as the report resources module 826, shown in FIG. 8. A means for sending to the UE the indication of the allocation of resources for the interference report, wherein the interference report is received based on the allocation of resources may include, e.g., the one or more processors 802 with dedicated hardware or implementing executable code or software instructions in memory 804 and/or medium 820 in base station 800, such as the report resources module 826, shown in FIG. 8. A means for receiving from the UE a request for the allocation of resources for the interference report, wherein the indication of the allocation of resources is sent to the UE in response to the request of the allocation of resources may include, e.g., the one or more processors 802 with dedicated hardware or implementing executable code or software instructions in memory 804 and/or medium 820 in base station 800, such as the report resources module 826, shown in FIG. 8.

In one implementation, the base station may determine whether the device is engaged in the active security attack in the wireless network by sending information from the interference report to a network entity for determining whether the device is engaged in the active security attack in the wireless network, e.g., as discussed at stage 726*a* or 726*b* of FIG. 7. A means for sending information from the interference report to a network entity for determining whether the device is engaged in the active security attack in the wireless network may include, e.g., the external interface 816 and one or more processors 802 with dedicated hardware or implementing executable code or software instructions in memory 804 and/or medium 820 in base station 800, such as the interference report module 822, shown in FIG. 8. The base station may receive from the network entity an indication to bar the device from accessing the wireless network in response to the determination that the device is engaged in the active security attack by the network entity, e.g., as discussed at stage 730*a* and 730*b* of FIG. 7. A means for receiving from the network entity an indication to bar the device from accessing the wireless network in response to the determination that the device is engaged in the active security attack by the network entity may include, e.g., the external interface 816 and one or more processors 802 with dedicated hardware or implementing executable code or software instructions in memory 804 and/or medium 820 in base station 800, such as the access barring module 828, shown in FIG. 8.

In some implementations, the base station may receive from the network entity information from a second interference report from a second UE including a second AoA and second power information measured by the second UE for second one or more interfering signals transmitted by the device, e.g., as discussed at stage 726*a* or 726*b*. The determination that the device is engaged in the active security attack in the wireless network may be performed collectively with at least the network entity based at least partially on a position of the device determined from the information from the interference report and the information from the second interference report, e.g., as discussed at stage 728*c* of FIG. 7. A means for receiving from the network entity information from a second interference report from a second UE including a second AoA and second power information measured by the second UE for second one or more interfering signals transmitted by the device may include, e.g., the external interface 816 and one or more processors 802 with dedicated hardware or implementing executable code or software instructions in memory 804 and/or medium 820 in base station 800, such as the interference report module 822, shown in FIG. 8. A means for determining collectively with at least the second base station whether the device is engaged in the active security attack in the wireless network based at least partially on a position of the device determined from the information from the interference report and the information from the second interference report may include, e.g., the external interface 816 and one or more processors 802 with dedicated hardware or implementing executable code or software instructions in memory 804 and/or medium 820 in base station 800, such as the attack detect module 824, shown in FIG. 8.

In one implementation, the base station may receive information from a second interference report from a second UE including a second AoA and second power information measured by the second UE for second one or more interfering signals transmitted by the device, e.g., as discussed at stage 726*a* or 726*b* of FIG. 7. The determination that the device is engaged in the active security attack in the wireless network may be based at least partially on a position of the device determined from the information from the interference report and the information from the second interference report, e.g., as discussed at stage 728*a*, 728*b*, and 728*c* of FIG. 7. A means for receiving information from a second interference report from a second UE including a second AoA and second power information measured by the second UE for second one or more interfering signals transmitted by the device may include, e.g., the external interface 816 and one or more processors 802 with dedicated hardware or implementing executable code or software instructions in memory 804 and/or medium 820 in base station 800, such as the interference report module 822, shown in FIG. 8. A means for determining whether the device is engaged in the active security attack in the wireless network based at least partially on a position of the device determined from the information from the interference report and the information from the second interference report may include, e.g., the external interface 816 and one or more processors 802 with dedicated hardware or implementing executable code or software instructions in memory 804 and/or medium 820 in base station 800, such as the attack detect module 824, shown in FIG. 8. The base station may further send to a network entity an indication to bar the device from accessing the wireless network in response to the determination the device is engaged in the active security attack, e.g., as discussed at stage 730*a* and 730*b* of FIG. 7. In some implementations, the determination that the device is engaged in the active security attack may be made collectively with at least the network entity, e.g., as discussed at stage 728*c* of FIG. 7. A means for sending to a network entity an indication to bar the device from accessing the wireless network in response to the determination the device is engaged in the active security attack may include, e.g., the external interface 816 and one or more processors 802 with dedicated hardware or implementing executable code or software instructions in memory 804 and/or medium 820 in base station 800, such as the access barring module 828, shown in FIG. 8.

Figure 11:
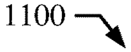
FIG. 11 shows a flow diagram for an exemplary method performed by a UE in a wireless network for preventing active security attacks in the wireless network.
Figure 11:
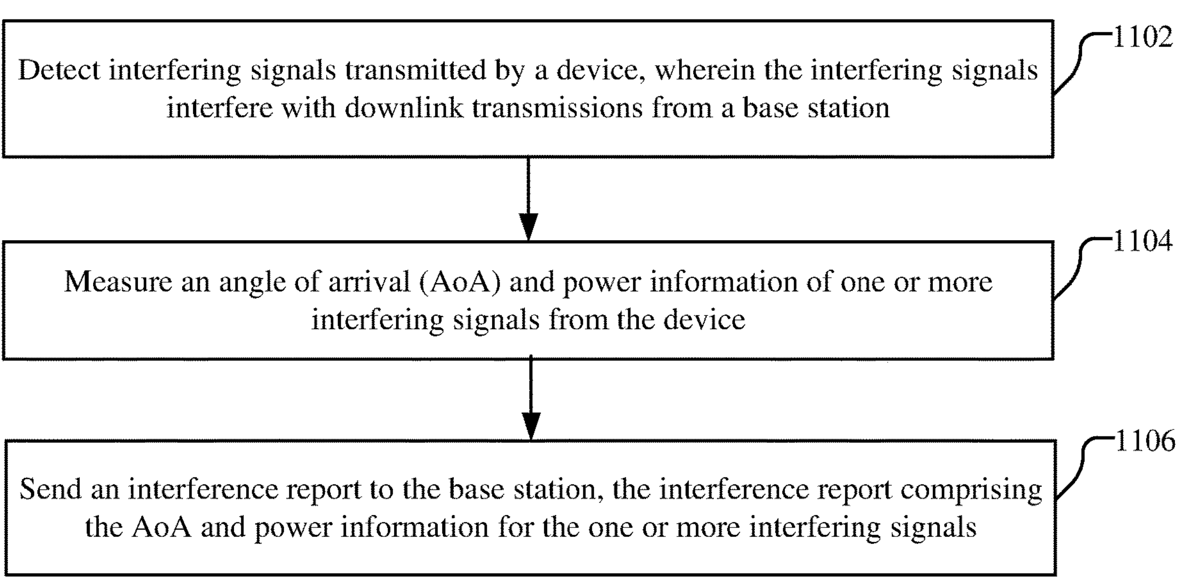

FIG. 11 shows a flow diagram for an exemplary method 1100 performed by a UE in a wireless network for preventing active security attacks in the wireless network. The UE, for example, may be a UE 104, 204, 304, 604, 704, or 900.

At block 1102, the UE detects interfering signals transmitted by a device, wherein the interfering signals interfere with downlink transmissions from a base station, e.g., as discussed at stages 712 and 714 of FIG. 7. A means for detecting interfering signals transmitted by a device, wherein the interfering signals interfere with downlink transmissions from a base station may include, e.g., the wireless transceiver 810 and one or more processors 902 with dedicated hardware or implementing executable code or software instructions in memory 904 and/or medium 920 in server 900, such as the interference detection module 922, shown in FIG. 9.

At block 1104, the UE measures an angle of arrival (AoA) and power information of one or more interfering signals from the device, e.g., as discussed in FIG. 6 and at stage 714 of FIG. 7. The power information, for example, may be a measured strength of the interfering signal. The power information may further comprise at least one of eigenvalues for the power of the one or more interfering signals, an interference pattern in time and frequency of the one or more interfering signals, or a combination thereof. A means for measuring an angle of arrival (AoA) and power information of one or more interfering signals from the device may include, e.g., the wireless transceiver 810 and one or more processors 902 with dedicated hardware or implementing executable code or software instructions in memory 904 and/or medium 920 in server 900, such as the measurement module 924, shown in FIG. 9.

At block 1106, the UE sends an interference report to the base station, the interference report including the AoA and power information for the one or more interfering signals, e.g., as discussed at stage 724 of FIG. 7. A means for sending an interference report to the base station, the interference report including the AoA and power information for the one or more interfering signals may include, e.g., the wireless transceiver 810 and one or more processors 902 with dedicated hardware or implementing executable code or software instructions in memory 904 and/or medium 920 in server 900, such as the interference report module 926, shown in FIG. 9.

In some implementations, the UE may receive an indication of allocation of resources for the interference report from the base station, wherein the allocated resources are used for sending the interference report. The indication of the allocation of resources for the interference report, for example, may be received in a Downlink Control Information (DCI) message from the base station. A means for receiving an indication of allocation of resources for the interference report from the base station, wherein the allocated resources are used for sending the interference report may include, e.g., the wireless transceiver 810 and one or more processors 902 with dedicated hardware or implementing executable code or software instructions in memory 904 and/or medium 920 in server 900, such as the report resources module 928, shown in FIG. 9. In some implementations, the UE may send a request for the allocation of resources for the interference report to the base station, wherein the indication of the allocation of resources is received from the base station in response to the request of the allocation of resources, e.g., as illustrated at stage 716 of FIG. 7. A means for sending a request for the allocation of resources for the interference report to the base station, wherein the indication of the allocation of resources is received from the base station in response to the request of the allocation of resources may include, e.g., the wireless transceiver 810 and one or more processors 902 with dedicated hardware or implementing executable code or software instructions in memory 904 and/or medium 920 in server 900, such as the report resources module 928, shown in FIG. 9. The request for the allocation of resources may include a number of sources of interfering signals detected by the UE. For example, the UE may detect interfering signals from a plurality of devices and may measure the AoA and power information for the interfering signals from each of the plurality of devices, wherein the allocation of resources received from the base station is configured for interference reports for each of the plurality of devices. In another example, the UE may detect interfering signals from a plurality of devices and may measure the AoA and power information for the interfering signals from each of the plurality of devices, wherein the allocation of resources received from the base station is configured for interference reports for less than all of the plurality of devices.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, nonvolatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining." "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method performed by base station in a wireless network for preventing active security attacks in the wireless network, the method comprising: receiving an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determining whether the device is engaged in an active security attack in the wireless network based at least in part on the AoA and power information received in the interference report from the UE; and in response to a determination that the device is engaged in the active security attack, performing at least one of barring the device from accessing the wireless network, sending a report indicating that the device is engaged in the active security attack, or both.

Clause 2. The method of clause 1, wherein the power information comprises a measured strength of the interfering signal.

Clause 3. The method of clause 2, wherein the power information further comprises at least one of eigenvalues for the power of the one or more interfering signals, an interference pattern in time and frequency of the one or more interfering signals, or a combination thereof.

Clause 4. The method of any of clauses 1-3, further comprising: configuring an allocation of resources for the UE to send the interference report; and sending to the UE an indication of the allocation of resources for the interference report, wherein the interference report is received based on the allocation of resources.

Clause 5. The method of clause 4, further comprising receiving from the UE a request for the allocation of resources for the interference report, wherein the indication of the allocation of resources is sent to the UE in response to the request of the allocation of resources.

Clause 6. The method of clause 5, wherein the request for the allocation of resources includes a number of sources of interfering signals detected by the UE.

Clause 7. The method of clause 6, wherein the allocation of resources is configured for interference reports for each source of interfering signals detected by the UE.

Clause 8. The method of clause 6, wherein the allocation of resources is configured for interference reports for less than all of the sources of interfering signals detected by the UE.

Clause 9. The method of clause 4, wherein the indication of the allocation of resources for the interference report is sent to the UE in a Downlink Control Information (DCI) message.

Clause 10. The method of any of clauses 1-9, wherein determining whether the device is engaged in the active security attack in the wireless network comprises sending information from the interference report to a network entity for determining whether the device is engaged in the active security attack in the wireless network.

Clause 11. The method of clause 10, further comprising receiving from the network entity an indication to bar the device from accessing the wireless network in response to the determination that the device is engaged in the active security attack by the network entity.

Clause 12. The method of clause 10, further comprising: receiving from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

Clause 13. The method of any of clauses 1-12, further comprising: receiving information from a second interference report from a second UE comprising a second AoA and second power information measured by the second UE for second one or more interfering signals transmitted by the device; and wherein the determination that the device is engaged in the active security attack in the wireless network is performed based at least partially on a position of the device determined from the information from the interference report and the information from the second interference report.

Clause 14. The method of clause 13, further comprising sending to a network entity an indication to bar the device from accessing the wireless network in response to the determination that the device is engaged in the active security attack.

Clause 15. The method of clause 13, wherein the determination that the device is engaged in the active security attack is made collectively with at least the network entity.

Clause 16. A base station in a wireless network configured for preventing active security attacks in the wireless network, comprising: an external interface configured to communicate with entities in the wireless network; at least one memory; and at least one processor coupled to the external interface and the at least one memory, the at least one processor configured to: receive, via the external transmitter, an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determine whether the device is engaged in an active security attack in the wireless network based at least in part on the AoA and power information received in the interference report from the UE; and in response to a determination that the device is engaged in the active security attack, the at least one processor is configured to perform at least one of barring the device from accessing the wireless network, sending a report indicating that the device is engaged in the active security attack, or both.

Clause 17. The base station of clause 16, wherein the power information comprises a measured strength of the interfering signal.

Clause 18. The base station of clause 17, wherein the power information further comprises at least one of eigenvalues for the power of the one or more interfering signals, an interference pattern in time and frequency of the one or more interfering signals, or a combination thereof.

Clause 19. The base station of any of clauses 16-18, wherein the at least one processor is further configured to: configure an allocation of resources for the UE to send the interference report; and send, via the external transmitter, to the UE an indication of the allocation of resources for the interference report, wherein the interference report is received based on the allocation of resources.

Clause 20. The base station of clause 19, wherein the at least one processor is further configured to receive, via the external transmitter, from the UE a request for the allocation of resources for the interference report, wherein the indication of the allocation of resources is sent to the UE in response to the request of the allocation of resources.

Clause 21. The base station of clause 20, wherein the request for the allocation of resources includes a number of sources of interfering signals detected by the UE.

Clause 22. The base station of clause 21, wherein the allocation of resources is configured for interference reports for each source of interfering signals detected by the UE.

Clause 23. The base station of clause 21, wherein the allocation of resources is configured for interference reports for less than all of the sources of interfering signals detected by the UE.

Clause 24. The base station of clause 19, wherein the indication of the allocation of resources for the interference report is sent to the UE in a Downlink Control Information (DCI) message.

Clause 25. The base station of any of clauses 16-24, wherein the at least one processor is configured to determine whether the device is engaged in the active security attack in the wireless network by being configured to send information from the interference report to a network entity for determining whether the device is engaged in the active security attack in the wireless network.

Clause 26. The base station of clause 25, wherein the at least one processor is further configured to receive, via the external interface, from the network entity an indication to bar the device from accessing the wireless network in response to the determination that the device is engaged in the active security attack by the network entity.

Clause 27. The base station of clause 25, wherein the at least one processor is further configured to: receive, via the external interface, from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

Clause 28. The base station of any of clauses 16-27, wherein the at least one processor is further configured to: receive, via the external interface, information from a second interference report from a second UE comprising a second AoA and second power information measured by the second UE for second one or more interfering signals transmitted by the device; and wherein the determination that the device is engaged in the active security attack in the wireless network is based at least partially on a position of the device determined from the information from the interference report and the information from the second interference report.

Clause 29. The base station of clause 28, wherein the at least one processor is further configured to send, via the external interface, to a network entity an indication to bar the device from accessing the wireless network in response to the determination that the device is engaged in the active security attack.

Clause 30. The base station of clause 28, wherein the determination that the device is engaged in the active security attack is made collectively with at least the network entity.

Clause 31. A base station in a wireless network configured for preventing active security attacks in the wireless network, comprising: means for receiving an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; means for determining whether the device is engaged in an active security attack in the wireless network based at least in part on the AoA and power information received in the interference report from the UE; and in response to a determination that the device is engaged in the active security attack, the base station comprises a means for barring that bars the device from accessing the wireless network, a means for reporting that sends a report indicating that the device is engaged in the active security attack, or both.

Clause 32. The base station of clause 31, wherein the power information comprises a measured strength of the interfering signal.

Clause 33. The base station of clause 32, wherein the power information further comprises at least one of eigenvalues for the power of the one or more interfering signals, an interference pattern in time and frequency of the one or more interfering signals, or a combination thereof.

Clause 34. The base station of any of clauses 31-33, further comprising: means for configuring an allocation of resources for the UE to send the interference report; and means for sending an indication of to the UE the allocation of resources for the interference report, wherein the interference report is received based on the allocation of resources.

Clause 35. The base station of clause 34, further comprising means for receiving from the UE a request for the allocation of resources for the interference report, wherein the indication of the allocation of resources is sent to the UE in response to the request of the allocation of resources.

Clause 36. The base station of clause 35, wherein the request for the allocation of resources includes a number of sources of interfering signals detected by the UE.

Clause 37. The base station of clause 36, wherein the allocation of resources is configured for interference reports for each source of interfering signals detected by the UE.

Clause 38. The base station of clause 36, wherein the allocation of resources is configured for interference reports for less than all of the sources of interfering signals detected by the UE.

Clause 39. The base station of clause 34, wherein the indication of the allocation of resources for the interference report is sent to the UE in a Downlink Control Information (DCI) message.

Clause 40. The base station of any of clauses 31-39, wherein the means for determining whether the device is engaged in the active security attack in the wireless network comprises means for sending information from the interference report to a network entity for determining whether the device is engaged in the active security attack in the wireless network.

Clause 41. The base station of clause 40, further comprising means for receiving from the network entity an indication to bar the device from accessing the wireless network in response to the determination that the device is engaged in the active security attack by the network entity.

Clause 42. The base station of clause 40, further comprising: means for receiving from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

Clause 43. The base station of any of clauses 31-42, further comprising: means for receiving information from a second interference report from a second UE comprising a second AoA and second power information measured by the second UE for second one or more interfering signals transmitted by the device; and wherein the determination that the device is engaged in the active security attack in the wireless network is based at least partially on a position of the device determined from the information from the interference report and the information from the second interference report.

Clause 44. The base station of clause 43, further comprising means for sending to a network entity an indication to bar the device from accessing the wireless network in response to the determination the device is engaged in the active security attack.

Clause 45. The base station of clause 43, wherein the determination that the device is engaged in the active security attack is made collectively with at least the network entity.

Clause 46. A non-transitory computer readable medium including program code stored thereon, the program code is operable to configure at least one processor in a base station in a wireless network for preventing active security attacks in the wireless network, the program code comprising instructions to: receive an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station; determine whether the device is engaged in an active security attack in the wireless network based at least in part on the AoA and power information received in the interference report from the UE; and in response to a determination that the device is engaged in the active security attack, the program code comprises instructions for at least one of barring the device from accessing the wireless network, sending a report indicating that the device is engaged in the active security attack, or both.

Clause 47. The non-transitory computer readable medium of clause 46, wherein the power information comprises a measured strength of the interfering signal.

Clause 48. The non-transitory computer readable medium of clause 47, wherein the power information further comprises at least one of eigenvalues for the power of the one or more interfering signals, an interference pattern in time and frequency of the one or more interfering signals, or a combination thereof.

Clause 49. The non-transitory computer readable medium of any of clauses 46-48, further comprising: configure an allocation of resources for the UE to send the interference report; and send to the UE an indication of the allocation of resources for the interference report, wherein the interference report is received based on the allocation of resources.

Clause 50. The non-transitory computer readable medium of clause 49, further comprising receive from the UE a request for the allocation of resources for the interference report, wherein the indication of the allocation of resources is sent to the UE in response to the request of the allocation of resources.

Clause 51. The non-transitory computer readable medium of clause 50, wherein the request for the allocation of resources includes a number of sources of interfering signals detected by the UE.

Clause 52. The non-transitory computer readable medium of clause 51, wherein the allocation of resources is configured for interference reports for each source of interfering signals detected by the UE.

Clause 53. The non-transitory computer readable medium of clause 51, wherein the allocation of resources is configured for interference reports for less than all of the sources of interfering signals detected by the UE.

Clause 54. The non-transitory computer readable medium of clause 49, wherein the indication of the allocation of resources for the interference report is sent to the UE in a Downlink Control Information (DCI) message.

Clause 55. The non-transitory computer readable medium of any of clauses 46-54, wherein determine whether the device is engaged in the active security attack in the wireless network comprises send information from the interference report to a network entity for determining whether the device is engaged in the active security attack in the wireless network.

Clause 56. The non-transitory computer readable medium of clause 55, wherein the program code is further configured to receive from the network entity an indication to bar the device from accessing the wireless network in response to the determination that the device is engaged in the active security attack by the network entity.

Clause 57. The non-transitory computer readable medium of clause 55, wherein the program code is further configured to: receive from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

Clause 58. The non-transitory computer readable medium of any of clauses 46-57, further comprising, wherein the program code is further configured to: receive information from a second interference report from a second UE comprising a second AoA and second power information measured by the second UE for second one or more interfering signals transmitted by the device; and wherein the determination that the device is engaged in the active security attack in the wireless network is based at least partially on a position of the device determined from the information from the interference report and the information from the second interference report.

Clause 59. The non-transitory computer readable medium of clause 58, wherein the program code is further configured to send to the network entity an indication to bar the device from accessing the wireless network in response to the determination that the device is engaged in the active security attack.

Clause 60. The non-transitory computer readable medium of clause 58, wherein the determination that the device is engaged in the active security attack is made collectively with at least the network entity.

Clause 61. A method performed by a user equipment (UE) for preventing active security attacks in a wireless network, the method comprising: detecting interfering signals transmitted by a device, wherein the interfering signals interfere with downlink transmissions from a base station; measuring an angle of arrival (AoA) and power information of one or more interfering signals from the device; and sending an interference report to the base station, the interference report comprising the AoA and power information for the one or more interfering signals.

Clause 62. The method of clause 61, wherein the power information comprises a measured strength of the interfering signal.

Clause 63. The method of clause 62, wherein the power information further comprises at least one of eigenvalues for the power of the one or more interfering signals, an interference pattern in time and frequency of the one or more interfering signals, or a combination thereof.

Clause 64. The method of any of clauses 61-63, further comprising receiving an indication of allocation of resources for the interference report from the base station, wherein the allocated resources are used for sending the interference report Clause 65. The method of clause 64, further comprising sending a request for the allocation of resources for the interference report to the base station, wherein the indication of the allocation of resources is received from the base station in response to the request of the allocation of resources.

Clause 66. The method of clause 65, wherein the request for the allocation of resources includes a number of sources of interfering signals detected by the UE.

Clause 67. The method of clause 66, further comprising detecting interfering signals from a plurality of devices and measuring the AoA and power information for the interfering signals from each of the plurality of devices, wherein the allocation of resources received from the base station is configured for interference reports for each of the plurality of devices.

Clause 68. The method of clause 66, further comprising detecting interfering signals from a plurality of devices and measuring the AoA and power information for the interfering signals from each of the plurality of devices, wherein the allocation of resources received from the base station is configured for interference reports for less than all of the plurality of devices.

Clause 69. The method of clause 64, wherein the indication of the allocation of resources for the interference report is received in a Downlink Control Information (DCI) message from the base station.

Clause 70. A user equipment (UE) configured for preventing active security attacks in a wireless network, the method comprising: a wireless transceiver configured to communicate with base stations in a wireless network; at least one memory; and at least one processor coupled to the wireless transceiver and the at least one memory, the at least one processor configured to: detect interfering signals transmitted by a device, wherein the interfering signals interfere with downlink transmissions from a base station; measure an angle of arrival (AoA) and power information of one or more interfering signals from the device; and send, via the wireless transceiver, an interference report to the base station, the interference report comprising the AoA and power information for the one or more interfering signals.

Clause 71. The UE of clause 70, wherein the power information comprises a measured strength of the interfering signal.

Clause 72. The UE of clause 71, wherein the power information further comprises at least one of eigenvalues for the power of the one or more interfering signals, an interference pattern in time and frequency of the one or more interfering signals, or a combination thereof.

Clause 73. The UE of any of clauses 70-72, wherein the at least one processor is further configured to receive an indication of allocation of resources for the interference report from the base station, wherein the allocated resources are used for sending the interference report.

Clause 74. The UE of clause 73, wherein the at least one processor is further configured to send a request for the allocation of resources for the interference report to the base station, wherein the indication of the allocation of resources is received from the base station in response to the request of the allocation of resources.

Clause 75. The UE of clause 74, wherein the request for the allocation of resources includes a number of sources of interfering signals detected by the UE.

Clause 76. The UE of clause 75, wherein the at least one processor is further configured to detect interfering signals from a plurality of devices and measure the AoA and power information for the interfering signals from each of the plurality of devices, wherein the allocation of resources received from the base station is configured for interference reports for each of the plurality of devices.

Clause 77. The UE of clause 75, wherein the at least one processor is further configured to detect interfering signals from a plurality of devices and measure the AoA and power information for the interfering signals from each of the plurality of devices, wherein the allocation of resources received from the base station is configured for interference reports for less than all of the plurality of devices.

Clause 78. The UE of clause 73, wherein the indication of the allocation of resources for the interference report is received in a Downlink Control Information (DCI) message from the base station.

Clause 79. A user equipment (UE) configured for preventing active security attacks in a wireless network, the method comprising: means for detecting interfering signals transmitted by a device, wherein the interfering signals interfere with downlink transmissions from a base station; means for measuring an angle of arrival (AoA) and power information of one or more interfering signals from the device; and means for sending an interference report to the base station, the interference report comprising the AoA and power information for the one or more interfering signals.

Clause 80. The UE of clause 79, wherein the power information comprises a measured strength of the interfering signal.

Clause 81. The UE of clause 80, wherein the power information further comprises at least one of eigenvalues for the power of the one or more interfering signals, an interference pattern in time and frequency of the one or more interfering signals, or a combination thereof.

Clause 82. The UE of any of clauses 79-81, further comprising means for receiving an indication of allocation of resources for the interference report from the base station, wherein the allocated resources are used for sending the interference report.

Clause 83. The UE of clause 82, further comprising means for sending a request for the allocation of resources for the interference report to the base station, wherein the indication of the allocation of resources is received from the base station in response to the request of the allocation of resources.

Clause 84. The UE of clause 83, wherein the request for the allocation of resources includes a number of sources of interfering signals detected by the UE.

Clause 85. The UE of clause 84, further comprising means for detecting interfering signals from a plurality of devices and means for measuring the AoA and power information for the interfering signals from each of the plurality of devices, wherein the allocation of resources received from the base station is configured for interference reports for each of the plurality of devices.

Clause 86. The UE of clause 84, further comprising means for detecting interfering signals from a plurality of devices and means for measuring the AoA and power information for the interfering signals from each of the plurality of devices, wherein the allocation of resources received from the base station is configured for interference reports for less than all of the plurality of devices.

Clause 87. The UE of clause 82, wherein the indication of the allocation of resources for the interference report is received in a Downlink Control Information (DCI) message from the base station.

Clause 88. A non-transitory computer storage medium including program code stored thereon, the program code is operable to configure at least one processor in a user equipment (UE) for preventing active security attacks in a wireless network, the program code comprising instructions to: detect interfering signals transmitted by a device, wherein the interfering signals interfere with downlink transmissions from a base station; measure an angle of arrival (AoA) and power information of one or more interfering signals from the device; and send an interference report to the base station, the interference report comprising the AoA and power information for the one or more interfering signals.

Clause 89. The non-transitory computer readable medium of clause 88, wherein the power information comprises a measured strength of the interfering signal.

Clause 90. The non-transitory computer readable medium of clause 89, wherein the power information further comprises at least one of eigenvalues for the power of the one or more interfering signals, an interference pattern in time and frequency of the one or more interfering signals, or a combination thereof.

Clause 91. The non-transitory computer readable medium of any of clauses 88-90, further comprising instructions to receive an indication of allocation of resources for the interference report from the base station, wherein the allocated resources are used for sending the interference report.

Clause 92. The non-transitory computer readable medium of clause 91, further comprising instructions to send a request for the allocation of resources for the interference report to the base station, wherein the indication of the allocation of resources is received from the base station in response to the request of the allocation of resources.

Clause 93. The non-transitory computer readable medium of clause 92, wherein the request for the allocation of resources includes a number of sources of interfering signals detected by the UE.

Clause 94. The non-transitory computer readable medium of clause 93, further comprising instructions to detect interfering signals from a plurality of devices and measure the AoA and power information for the interfering signals from each of the plurality of devices, wherein the allocation of resources received from the base station is configured for interference reports for each of the plurality of devices.

Clause 95. The non-transitory computer readable medium of clause 93, further comprising instructions to detect interfering signals from a plurality of devices and measure the AoA and power information for the interfering signals from each of the plurality of devices, wherein the allocation of resources received from the base station is configured for interference reports for less than all of the plurality of devices.

Clause 96. The non-transitory computer readable medium of clause 91, wherein the indication of the allocation of resources for the interference report is received in a Downlink Control Information (DCI) message from the base station.

Therefore, it is intended that claimed subject matter not be limited to the particular examples disclosed, but that such claimed subject matter may also include all aspects falling within the scope of appended claims, and equivalents thereof.

What is claimed is:

1. A method performed by base station in a wireless network for preventing active security attacks in the wireless network, the method comprising:

receiving an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station;

determining that the device is engaged in an active security attack in the wireless network based at least in part on the AoA and power information received in the interference report from the UE; and in response to a determination that the device is engaged in the active security attack, performing at least one of barring the device from accessing the wireless network, sending a report indicating that the device is engaged in the active security attack, or both.

2. The method of claim 1, wherein the power information comprises a measured strength of the interfering signal.

3. The method of claim 2, wherein the power information further comprises at least one of eigenvalues for the power of the one or more interfering signals, an interference pattern in time and frequency of the one or more interfering signals, or a combination thereof.

4. The method of claim 1, further comprising:

configuring an allocation of resources for the UE to send the interference report; and sending to the UE an indication of the allocation of resources for the interference report, wherein the interference report is received based on the allocation of resources.

5. The method of claim 4, further comprising receiving from the UE a request for the allocation of resources for the interference report, wherein the indication of the allocation of resources is sent to the UE in response to the request of the allocation of resources.

6. The method of claim 5, wherein the request for the allocation of resources includes a number of sources of interfering signals detected by the UE.

7. The method of claim 6, wherein the allocation of resources is configured for interference reports for each source of interfering signals detected by the UE.

8. The method of claim 6, wherein the allocation of resources is configured for interference reports for less than all of the sources of interfering signals detected by the UE.

9. The method of claim 4, wherein the indication of the allocation of resources for the interference report is sent to the UE in a Downlink Control Information (DCI) message.

10. The method of claim 1, wherein determining that the device is engaged in the active security attack in the wireless network comprises sending information from the interference report to a network entity for determining that the device is engaged in the active security attack in the wireless network.

11. The method of claim 10, further comprising receiving from the network entity an indication to bar the device from accessing the wireless network in response to the determination that the device is engaged in the active security attack by the network entity.

12. The method of claim 10, further comprising:

receiving from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

13. The method of claim 1, further comprising:

receiving information from a second interference report from a second UE comprising a second AoA and second power information measured by the second UE for second one or more interfering signals transmitted by the device; and wherein the determination that the device is engaged in the active security attack in the wireless network is performed based at least partially on a position of the device determined from the information from the interference report and the information from the second interference report.

14. The method of claim 13, further comprising sending to a network entity an indication to bar the device from accessing the wireless network in response to the determination that the device is engaged in the active security attack.

15. The method of claim 13, wherein the determination that the device is engaged in the active security attack is made collectively with at least the network entity.

16. A base station in a wireless network configured for preventing active security attacks in the wireless network, comprising:

an external interface configured to communicate with entities in the wireless network;

at least one memory; and at least one processor coupled to the external interface and the at least one memory, the at least one processor configured to:

receive, via the external interface, an interference report from a user equipment (UE), the interference report comprising an angle of arrival (AoA) and power information measured by the UE for one or more interfering signals transmitted by a device, wherein the interfering signals interfere with reception by the UE of downlink transmissions from the base station;

determine that the device is engaged in an active security attack in the wireless network based at least in part on the AoA and power information received in the interference report from the UE; and in response to a determination that the device is engaged in the active security attack, the at least one processor is configured to perform at least one of barring the device from accessing the wireless network, sending a report indicating that the device is engaged in the active security attack, or both.

17. The base station of claim 16, wherein the power information comprises a measured strength of the interfering signal.

18. The base station of claim 17, wherein the power information further comprises at least one of eigenvalues for the power of the one or more interfering signals, an interference pattern in time and frequency of the one or more interfering signals, or a combination thereof.

19. The base station of claim 16, wherein the at least one processor is further configured to:

configure an allocation of resources for the UE to send the interference report; and send, via the external interface, to the UE an indication of the allocation of resources for the interference report, wherein the interference report is received based on the allocation of resources.

20. The base station of claim 19, wherein the at least one processor is further configured to receive, via the external interface, from the UE a request for the allocation of resources for the interference report, wherein the indication of the allocation of resources is sent to the UE in response to the request of the allocation of resources.

21. The base station of claim 20, wherein the request for the allocation of resources includes a number of sources of interfering signals detected by the UE.

22. The base station of claim 21, wherein the allocation of resources is configured for interference reports for each source of interfering signals detected by the UE.

23. The base station of claim 21, wherein the allocation of resources is configured for interference reports for less than all of the sources of interfering signals detected by the UE.

24. The base station of claim 19, wherein the indication of the allocation of resources for the interference report is sent to the UE in a Downlink Control Information (DCI) message.

25. The base station of claim 16, wherein the at least one processor is configured to determine that the device is engaged in the active security attack in the wireless network by being configured to send information from the interference report to a network entity for determining that the device is engaged in the active security attack in the wireless network.

26. The base station of claim 25, wherein the at least one processor is further configured to receive, via the external interface, from the network entity an indication to bar the device from accessing the wireless network in response to the determination that the device is engaged in the active security attack by the network entity.

27. The base station of claim 25, wherein the at least one processor is further configured to:

receive, via the external interface, from the network entity information from a second interference report from a second UE comprising a second AoA and second power information measured by the second UE for second one or more interfering signals transmitted by the device; and wherein the determination that the device is engaged in the active security attack in the wireless network is performed collectively with at least the network entity based at least partially on a position of the device determined from the information from the interference report and the information from the second interference report.

28. The base station of claim 16, wherein the at least one processor is further configured to:

receive, via the external interface, information from a second interference report from a second UE comprising a second AoA and second power information measured by the second UE for second one or more interfering signals transmitted by the device; and wherein the determination that the device is engaged in the active security attack in the wireless network is based at least partially on a position of the device determined from the information from the interference report and the information from the second interference report.

29. The base station of claim 28, wherein the at least one processor is further configured to send, via the external interface, to a network entity an indication to bar the device from accessing the wireless network in response to the determination that the device is engaged in the active security attack.

30. The base station of claim 28, wherein the determination that the device is engaged in the active security attack is made collectively with at least the network entity.

31. A method performed by a user equipment (UE) for preventing active security attacks in a wireless network, the method comprising:

detecting interfering signals transmitted by a device, wherein the interfering signals interfere with downlink transmissions from a base station;

measuring an angle of arrival (AoA) and power information of one or more interfering signals from the device; and sending an interference report to the base station, the interference report comprising the AoA and power information for the one or more interfering signals, wherein sending the interference report to the base station further comprises:

sending a request for allocation of resources for the interference report to the base station, wherein the request for the allocation of resources includes a number of sources of interfering signals detected by the UE;

receiving an indication of the allocation of resources for the interference report from the base station, wherein the allocated resources are used for sending the interference report.

32. The method of claim 31, wherein the power information comprises a measured strength of the interfering signal.

33. The method of claim 32, wherein the power information further comprises at least one of eigenvalues for the power of the one or more interfering signals, an interference pattern in time and frequency of the one or more interfering signals, or a combination thereof.

34. The method of claim 31, further comprising detecting interfering signals from a plurality of devices and measuring the AoA and power information for the interfering signals from each of the plurality of devices, wherein the allocation of resources received from the base station is configured for interference reports for each of the plurality of devices.

35. The method of claim 31, further comprising detecting interfering signals from a plurality of devices and measuring the AoA and power information for the interfering signals from each of the plurality of devices, wherein the allocation of resources received from the base station is configured for interference reports for less than all of the plurality of devices.

36. The method of claim 31, wherein the indication of the allocation of resources for the interference report is received in a Downlink Control Information (DCI) message from the base station.

37. A user equipment (UE) configured for preventing active security attacks in a wireless network, the UE comprising:

a wireless transceiver configured to communicate with base stations in a wireless network;

at least one memory; and at least one processor coupled to the wireless transceiver and the at least one memory, the at least one processor configured to:

detect interfering signals transmitted by a device, wherein the interfering signals interfere with downlink transmissions from a base station;

measure an angle of arrival (AoA) and power information of one or more interfering signals from the device; and send, via the wireless transceiver, an interference report to the base station, the interference report comprising the AoA and power information for the one or more interfering signals, wherein, to send the interference report to the base station, the at least one processor is further configured to:

send a request for allocation of resources for the interference report to the base station, wherein the request for the allocation of resources includes a number of sources of interfering signals detected by the UE;

receive an indication of the allocation of resources for the interference report from the base station, wherein the allocated resources are used for sending the interference report.

38. The UE of claim 37, wherein the power information comprises a measured strength of the interfering signal.

39. The UE of claim 38, wherein the power information further comprises at least one of eigenvalues for the power of the one or more interfering signals, an interference pattern in time and frequency of the one or more interfering signals, or a combination thereof.

40. The UE of claim 37, wherein the at least one processor is further configured to detect interfering signals from a plurality of devices and measure the AoA and power information for the interfering signals from each of the plurality of devices, wherein the allocation of resources received from the base station is configured for interference reports for each of the plurality of devices.

41. The UE of claim 37, wherein the at least one processor is further configured to detect interfering signals from a plurality of devices and measure the AoA and power information for the interfering signals from each of the plurality of devices, wherein the allocation of resources received from the base station is configured for interference reports for less than all of the plurality of devices.

42. The UE of claim 37, wherein the indication of the allocation of resources for the interference report is received in a Downlink Control Information (DCI) message from the base station.

* * * * *